US011899885B2

(12) United States Patent
Thomas

(10) Patent No.: US 11,899,885 B2
(45) Date of Patent: *Feb. 13, 2024

(54) METHODS AND APPARATUS TO DETECT PROXIMITY OF OBJECTS TO COMPUTING DEVICES USING NEAR ULTRASONIC SOUND WAVES

(71) Applicant: Intel Corporation, Santa Clara, CA (US)

(72) Inventor: Tigi Thomas, Bangalore (IN)

(73) Assignee: INTEL CORPORATION, Santa Clara, CA (US)

( * ) Notice: Subject to any disclaimer, the term of this patent is extended or adjusted under 35 U.S.C. 154(b) by 583 days.

This patent is subject to a terminal disclaimer.

(21) Appl. No.: 16/940,993

(22) Filed: Jul. 28, 2020

(65) Prior Publication Data

US 2021/0048901 A1 Feb. 18, 2021

Related U.S. Application Data

(63) Continuation of application No. 16/363,315, filed on Mar. 25, 2019, now Pat. No. 10,725,588.

(51) Int. Cl.
  *G06F 3/043* (2006.01)
  *G06F 3/01* (2006.01)
  *G01S 15/04* (2006.01)

(52) U.S. Cl.
  CPC .............. *G06F 3/043* (2013.01); *G01S 15/04* (2013.01); *G06F 3/017* (2013.01)

(58) Field of Classification Search
  CPC ........ G01S 15/003; G01S 15/04; G01S 7/527; G06F 3/017; G06F 3/043
  See application file for complete search history.

(56) References Cited

U.S. PATENT DOCUMENTS

| 5,436,580 | A  | 7/1995 | Kellmann et al. |
| 6,542,436 | B1 | 4/2003 | Myllyla |

(Continued)

OTHER PUBLICATIONS

European Patent Office, "Extended European Search Report," issued in connection with European Appl. No. 20156572.8, dated Oct. 29, 2020, 13 pages.

(Continued)

*Primary Examiner* — Stacy Khoo
(74) *Attorney, Agent, or Firm* — Hanley, Flight & Zimmerman, LLC

(57) ABSTRACT

Methods and apparatus to detect proximity of objects to computing devices using near ultrasonic sound waves are disclosed. An example apparatus includes a signal generator to cause a speaker of a computing device to produce a series of pulses. Successive ones of the pulses are spaced at fixed intervals. Ones of the pulses having a central frequency between 18 kHz and 24 kHz. The example apparatus includes an echo profile generator to process noise information sensed by a microphone of the computing device. The noise information includes the pulses and echoes of the pulses reflected off objects in a vicinity of the computing device. The example apparatus further includes an object detection analyzer to determine whether a first object is within an activation region associated with the computing device based on the pulses and the echoes sensed by the microphone.

25 Claims, 11 Drawing Sheets

(56) References Cited

U.S. PATENT DOCUMENTS

| | | | |
|---|---|---|---|
| 10,725,588 | B2 | 7/2020 | Thomas |
| 10,754,475 | B2 | 8/2020 | Thomas |
| 2012/0313900 | A1 | 12/2012 | Dahl |
| 2013/0009875 | A1* | 1/2013 | Fry .................. G06F 3/017 345/175 |
| 2015/0085620 | A1 | 3/2015 | Macours |
| 2016/0098076 | A1* | 4/2016 | Chng ............... G06F 3/017 713/323 |
| 2017/0329928 | A1 | 11/2017 | Song et al. |
| 2017/0371419 | A1 | 12/2017 | Powell et al. |
| 2018/0160235 | A1 | 6/2018 | Lesso et al. |
| 2018/0299546 | A1 | 10/2018 | Suvanto |
| 2019/0187261 | A1 | 6/2019 | Peso Parada et al. |
| 2019/0220112 | A1 | 7/2019 | Thomas |
| 2019/0277966 | A1 | 9/2019 | Schoessler et al. |
| 2021/0048901 | A1 | 2/2021 | Thomas |
| 2021/0208664 | A1 | 7/2021 | Thomas |

OTHER PUBLICATIONS

European Patent Office, "Partial European Search Report," issued in connection with European Appl. No. 20156572.8, dated Jul. 29, 2020, 65 pages.

United States Patent and Trademark Office, "Notice of Allowance and Fee(s) Due," issued in connection with U.S. Appl. No. 16/363,315, dated Mar. 18, 2020, 8 pages.

European Patent Office, "Extended European Search Report," issued in connection with European Appl. No. 19210054.3, dated Jun. 22, 2020, 10 pages.

United States Patent and Trademark Office, "Advisory Action," issued in connection with U.S. Appl. No. 16/230,908, dated Mar. 26, 2020, 3 pages.

United States Patent and Trademark Office, "Corrected Notice of Allowability," issued in connection with U.S. Appl. No. 16/230,908, dated Jul. 16, 2020, 2 pages.

United States Patent and Trademark Office, "Final Office Action," issued in connection with U.S. Appl. No. 16/230,908, dated Jan. 23, 2020, 24 pages.

United States Patent and Trademark Office, "Non-Final Office Action," issued in connection with U.S. Appl. No. 16/230,908, dated Nov. 22, 2019, 17 pages.

United States Patent and Trademark Office, "Notice of Allowance and Fee(s) Due," issued in connection with U.S. Appl. No. 16/230,908, dated Apr. 27, 2020, 10 pages.

European Patent Office, "European Examination Report," issued in connection with European Appl. No. 20156572.8, dated May 27, 2022, 7 pages.

* cited by examiner

| Noise Type | Detection Accuracy | False Positive? |
|---|---|---|
| No Noise | 100% | No |
| 0dB White | 98% | No |
| 10dB White | 97% | No |
| 30dB White | 93% | No |
| Hissing Sound | 90% | No |
| Beating on Metal Surface | 98% | No |
| Beating on Wood Surface | 98% | No |
| Natural Talking | 98% | No |

FIG. 5

METHODS AND APPARATUS TO DETECT PROXIMITY OF OBJECTS TO COMPUTING DEVICES USING NEAR ULTRASONIC SOUND WAVES

RELATED APPLICATIONS

This patent arises from a continuation of U.S. patent application Ser. No. 16/363,315 (now U.S. Pat. No. 10,725, 588), which was filed on Mar. 25, 2019. U.S. patent application Ser. No. 16/363,315 is hereby incorporated by reference in its entirety.

FIELD OF THE DISCLOSURE

This disclosure relates generally to proximity sensing, and, more particularly, to methods and apparatus to detect proximity of objects to computing devices using near ultrasonic sound waves.

BACKGROUND

There are a number of different human-machine interfaces that enable people to interact with a computing device. Some example human-machine interfaces include a keyboard or keypad, a mouse or other pointing device, a touchscreen, etc. Other techniques have been developed that do not require a person to physically touch the device such as, for example, through voice commands and/or based on detecting of the proximity and/or gestures of a user near the device.

BRIEF DESCRIPTION OF THE DRAWINGS

FIG. 5 is a table providing experimental results from implementing teachings disclosed herein.

The figures are not to scale. In general, the same reference numbers will be used throughout the drawing(s) and accompanying written description to refer to the same or like parts.

Figure 1:
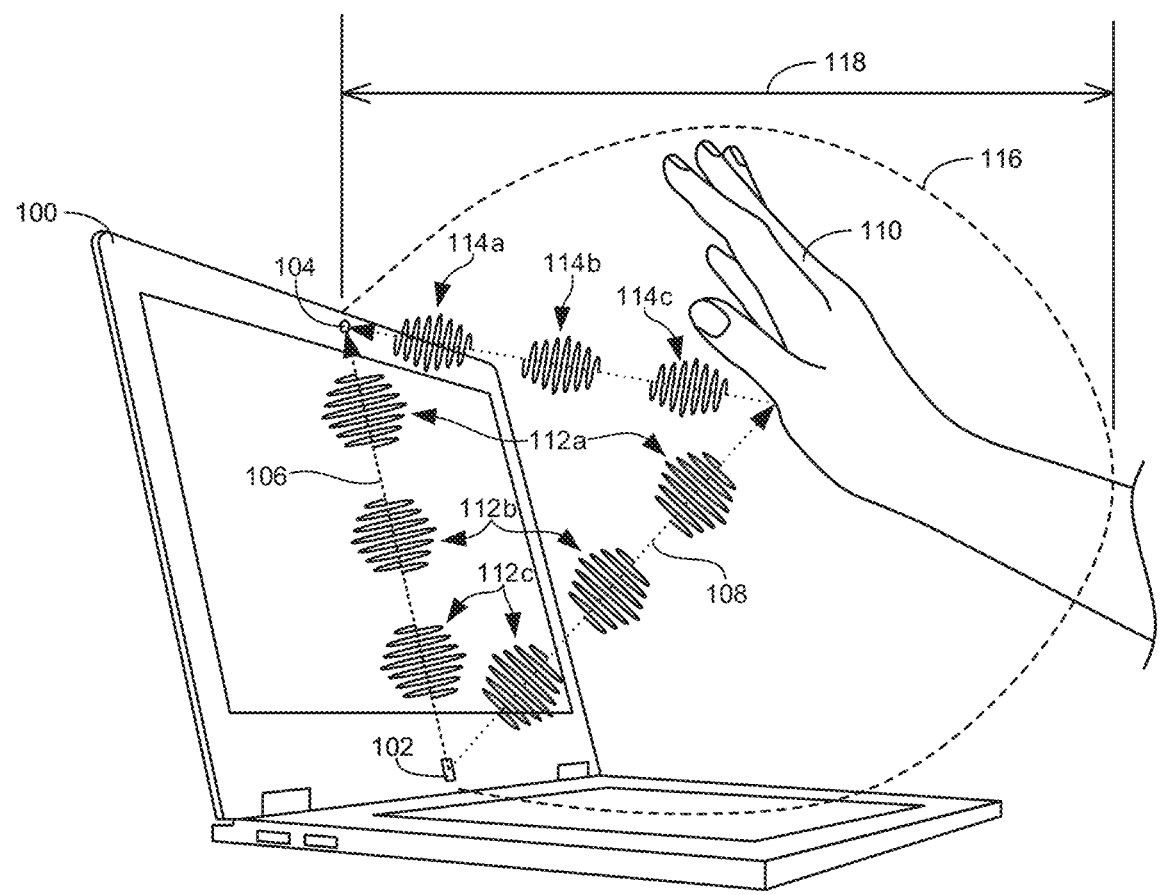
FIG. 1 illustrates an example computing device implemented in accordance with teachings disclosed herein.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

There are a variety of techniques that may be implemented by a computing device to identify and/or detect an object in proximity to the computing device. In some instances, infrared (IR) depth sensors may be employed. However, many existing computing devices do not include IR depth sensors, thus, limiting the applicability of such approaches and/or imposing increased costs to the development and manufacture of new devices that include the additional components to implement this technique. Further, the effective range of detection possible by IR sensors is relatively limited. Further still, processing IR sensor data is relatively computationally intensive, thereby requiring increased computational capacity and a corresponding increase in power capacity relative to devices that do not implement IR sensors.

A second technique to detect the proximity of objects include the processing of images captured by a camera. Image processing for object detection is computationally intensive. Indeed, many image processing applications implement dedicated hardware (e.g., a specialized image processor) to improve efficiencies in the heavy computations involved. Therefore, as with IR sensors, there are significant costs to include the components needed for effective image sensing. Furthermore, the relatively high computational burdens associated with image processing result in relatively significant power requirements.

A third approach to detecting proximity of objects is based on high bandwidth ultrasonic technologies. Such techniques involve specialized speakers, microphones, and/or associated circuitry that are not implemented in many known computing devices. For example, traditional speakers and microphones for mobile devices (e.g., laptops, tablets, smartphones, etc.) support only 48 kHz and/or 44.1 kHz sampling frequencies. However, some high bandwidth ultrasonic technologies employ sensors with high bandwidth (e.g., greater than 96 kHz) CODECs (e.g., speaker driving circuit) in the excitation path. Further, the sound capturing microphone and associated driving circuit also need to support high bandwidths beyond what is traditionally implemented in many existing computing devices. Therefore, there are increased costs in manufacturing devices capable of implementing such techniques because additional and/or more expensive components are required. Further, the higher bandwidths associated with such technique produces more data to be analyzed thereby resulting in increased computational burdens and associated increases in power requirements.

One particular application for object proximity detection is to enable a user of a computing device to cause the device to perform or initiate some action on the computing device without the user having to specifically touch the device. An example action might be to wake up the device from a sleep or idle state (e.g., a low power state) to an active (full power) state. As mentioned above, IR depth sensing techniques, image processing techniques, and high bandwidth ultrasonic sensing techniques require relatively significant amounts of power such that they are unsuitable for implementation in a low power state (e.g., a sleep state or idle state), particular in associated with mobile computing devices that rely on a battery for power.

Examples disclosed herein overcome the limitations of the above approaches by implementing a methodology that does not require any specialized components. Rather, examples disclosed herein may be implemented using typical speakers and microphones (that support 48 kHz/44.1 kHz sampling frequencies) commonly found in the vast majority of mobile devices and other computing devices that exist today. As a result, examples disclosed herein do not result in any additional costs to manufacture the devices that may implement the disclosed methodologies. Furthermore, the computational burden of examples disclosed herein is relatively small such that specialized processing components or not required. Further, the power requirements for examples disclosed herein are sufficiently low to enable implementation when the computing device is in a low power or idle state (e.g., asleep). That is, examples disclosed herein may be implement when a computing device is in a lower power state (e.g., in a sleep state) than when the device is in a fully active state to wake up the device from the lower power state to the fully active state.

More particularly, examples disclosed herein detect the presence and/or proximity of objects near a computing device based on near ultrasonic sound waves. Ultrasonic sound waves are sound waves with frequencies higher than the upper limit of the frequency ranges for sound that is audible to humans. While the upper limit of audible sound waves varies from person to person, the limit for most people is around 20 kilohertz (kHz). As used herein, near ultrasonic sound waves refer to sound waves within a region that is close to the upper limit of human hearing. More specifically, as used herein, near ultrasonic sound waves are sound waves having a frequency between 18 kHz and 24 kHz. By contrast, known high bandwidth ultrasonic sensing techniques mentioned above are typically implemented at frequencies well above the human limit of hearing (e.g., at frequencies above 40 kHz). Existing ultrasonic techniques operate at such high frequencies because operating in the near ultrasonic range (e.g., between 18 kHz and 24 kHz) has presented significant challenges due to noise in the environment. That is, while many devices already include speakers and microphones capable of operating in this frequency range, the noise that is picked up by microphones in this range has made it difficult to reliably identify relevant signals needed for accurate depth sensing. As described below, examples disclosed herein enable the identification and/or isolation of relevant signals within the near ultrasonic frequency range from among other noises that may be in the environment to allow for accurate and reliable object detection. Further, the processing of such signals is accomplished in a computationally and power efficient manner that is suitable for implementation when a computing device is in a low power sleep. As a result, examples disclosed herein may be used to detect the presence of an object (e.g., a user's hand) in the vicinity of a computing device in an idle state to trigger the device to wake up to a full power active state.

FIG. 1 illustrates an example computing device 100 implemented in accordance with teachings disclosed herein. The example computing device 100 includes a speaker 102 and a microphone 104. In the illustrated example, the computing device 100 is shown as a laptop computer. However, the computing device may be any type of computing device (e.g., a desktop computer, a tablet, a smartphone, etc.) that includes both a speaker 102 and a microphone 104. The speaker and microphone may be standard components that are built into the originally manufactured device. Although only one speaker 102 and one microphone 104 are shown, teachings disclosed herein may be implemented by a device that includes more than one speaker and/or more than one microphone.

The speaker 102 may emit or produce sound waves that propagate in the environment surrounding the computing device 100. In some examples, such acoustic signals may be detected by the microphone 104. More particularly, such acoustic signals may follow a direct signal path 106 in which the signals are sensed directly by the microphone 104. Additionally or alternatively, the signals may follow an indirect or echo signal path 108 in which the signals reflect off objects in the vicinity of the computing device 100 as an echo of the initial sound wave that is then sensed by the microphone 104. In the illustrated example, the echo signal path 108 is shown as reflected off the hand 110 of a user. However, the same acoustic signals may also reflect off other objects in the vicinity of the device 100 that are not represented in the illustrated example of FIG. 1. For example, the same acoustic signal produced by the speaker 102 may also reflect off the user's arm and/or other parts of the user's body (e.g., torso, face, etc.), with such echoes being sensed by the microphone 104. Further, the same acoustic signal may reflect as an echo off of furniture (e.g., a desk, a chair, etc.), walls, ceilings, and/or any other object(s) within the vicinity of the computing device 100.

For purposes of explanation, small waveforms are shown on each of the direct and echo signal paths 106, 108 to represent individual acoustic pulses (collectively identified by reference numeral 112) generated in series by the speaker 102 at fixed intervals. While separate waveforms are shown on both the direct signal path 106 and the echo signal path 108, corresponding ones of the waveforms on both paths 106, 108 are associated with the same acoustic pulses 112. That is, the two waveforms identified by reference numeral 112*a* correspond to a single first acoustic pulse 112*a* (i.e., both are generated from a single excitation of the speaker 102 at a single point in time). Similarly, the two waveforms identified by reference numeral 112*b* correspond to a single second acoustic pulse 112*b* generated a period of time (corresponding to the fixed interval for the repeating pulses 112) after the first acoustic pulse 112*a*. Further, the two waveforms identified by reference numeral 112*c* correspond to a single third acoustic pulse 112*c* generated a period of time after the second acoustic pulse 112*b*.

The illustrated example of FIG. 1 also includes additional waveforms along the echo signal path 108 after being reflected off the user's hand 110 to represent echoes 114*a*, 114*b*, 114*c* associated with additional acoustic pulses 112 generated before the first acoustic pulse 112*a*. The waveforms corresponding to the echoes 114*a*, 114*b*, 114*c* do not have a corresponding waveform shown on the direct signal path 106 in FIG. 1 because the associated acoustic pulses 112 have already reached the microphone 104 at the time represented in the illustrated example. That is, as shown in the illustrated example, the direct signal path 106 is shorter than the echo signal path 108 such that the microphone 104 will sense an acoustic pulse 112 propagating along the direct signal path 106 before sensing echoes 114 corresponding to the same acoustic pulse 112 propagating along the echo signal path 108. The time delay between when an acoustic pulse 112 is sensed directly by the microphone 104 and when an echo 114 of the same acoustic pulse 112 is sensed by the microphone 104 after reflecting off an object is proportional to the distance of the of the object from the computing device 100.

The waveforms representative of the echoes 114 in FIG. 1 are shown as being smaller (e.g., having less amplitude or power) than the first, second, and third acoustic pulses 112a, 112b, 112c because objects do not perfectly reflect acoustic signals. Rather, some power in the incident signal is lost when it is reflected as an echo. Furthermore, the strength of an echo is proportional to the size of the obstacle from which the echo was reflected. Another factor affecting the strength of an echo is the distance of the object. More particularly, the strength of an echo is inversely proportional to the distance of the object from the original source of the acoustic signal (e.g., the speaker 102). The time delay between the detecting of acoustic pulses 112 (via the direct signal path 106) and the detecting of corresponding echoes 114 in conjunction with the strength of the echoes 114 is used herein to identify the presence and/or proximity of an object (e.g., the user's hand 110) to the computing device 100. The acoustic pulses 112 sensed directly by the microphone 104 (via the direct signal path 106) are referred to herein as reference signals because they serve as reference points to which subsequently detected echoes 114 are compared to determine depth information indicative of the proximity or distance of objects (e.g., the user's hand 110) to the computing device 100.

As mentioned above, in some examples, the acoustic pulses 112 are generated at a fixed interval. The fixed interval establishes a consistent periodicity for the acoustic pulses 112 to enable reliable identification of the acoustic pulses 112 as they are sensed by the microphone 104 (as reference signals) after propagating along the direct signal path 106. More particularly, because the distance between the speaker 102 and the microphone 104 is fixed, the time for an acoustic pulse 112 to travel along the direct signal path 106 from the speaker 102 and be detected by microphone 104 as a reference signal is also fixed. Therefore, the interval between subsequent reference signals detected by the microphone 104 will match the fixed interval between the acoustic pulses 112 as produced by the speaker 102. In some examples, the fixed interval changes depending on whether the system is operating in a standby (lower power mode) or an active (higher power) mode. For instance, in some examples, the acoustic pulses 112 are generated by the speaker 102 at intervals of 125 milliseconds (or eight times a second) during the active mode and at intervals of 500 milliseconds (or twice a second) during the standby mode. In some examples, the fixed periodicity of the acoustic pulses 112 during the active mode may be more or less than 125 milliseconds. Likewise, the fixed periodicity of the acoustic pulses 112 during the standby mode may be more or less than 500 milliseconds. Regardless of the particular period of successive acoustic pulses 112 in each of the standby mode and active mode, the active mode is associated with a shorter interval than the standby mode. The shorter period or interval during the active mode serves to increase the accuracy and/or precision of the object detection process while the longer period or interval during the standby mode serves to reduce power consumption of the process. Although the active mode consumes more power than the standby mode because the speaker 102 is excited more frequently, as described more fully below, even the active mode is relatively power efficient because the duration of each individual acoustic pulse 112 is less than 1 millisecond (e.g., approximately 400 microseconds). Assuming a pulse duration of 400 microseconds with a repetition period of 125 milliseconds (during the active mode), the total amount of time the speaker 102 is excited each second is just over 3 milliseconds. Therefore, even during the active mode, the speaker 102 is actively producing acoustic pulses 112 less than 1 percent of the time such that relatively little power is consumed.

In some examples, in addition to the fixed periodicity, each successive acoustic pulse 112 is generated with a central frequency corresponding to near ultrasonic sound waves (e.g., in the range of 18 kHz to 24 kHz). For instance, in some examples, the acoustic pulses 112 are centered at approximately 22 kHz. In other examples, the central or nominal frequency may be lower than 22 kHz (e.g., 20 kHz) but at least above 18 kHz. In other examples, the central frequency of the acoustic pulses 112 may be higher than 22 kHz (e.g., 23 kHz) but no greater than 24 kHz. Further, in some examples, the acoustic pulses 112 are defined by a particular shape and power level so that the pulses remain substantially inaudible to humans. More particularly, in some examples, the acoustic pulses are shaped with sufficient ramp up time and ramp down time so that the pulses remain inaudible to humans. In some examples, the basic shape of the acoustic pulses 112 is defined by Equation 1:

$$x[n]=A \sin(2\pi(f/(Fs))n) \tag{Eq. 1}$$

where f is the excitation frequency that is centered within the near ultrasonic frequency range between 18 kHz and 24 kHz (e.g., centered at 22 kHz); Fs is the sampling frequency that corresponds to the sampling frequency supported by the microphone 104 (e.g., 48 kHz sampling frequency); n corresponds to the sample number along the signal length (N) that may be represented by any number of samples based on the sampling frequency and duration of the sample; and A is the amplitude that may have a value ranging from between 0.5 and 1 (e.g., 0.8). Further, the shape and generation of the acoustic pulses 112 is defined by an auto-correlation smoothening and a scaling factor defined as follows:

$$x1[n]=x[n] \otimes x[n] \tag{Eq. 2}$$

$$\text{ScaleFactor}=\text{Max}(x1[n])/2 \tag{Eq. 3}$$

A final pulse value at sample n in each acoustic pulse 112 may be defined by dividing Equation 2 by Equation 3:

$$y[n]=x1[n]/\text{ScaleFactor} \tag{Eq. 4}$$

While the acoustic pulses 112 generated by the speaker 102 have a consistent form and are produced at a consistent periodicity, the resulting echoes 114 corresponding to different ones of the pulses 112 do not necessarily have a consistent form (e.g., intensity) and may not be detected at consistent time intervals. Variation between different echoes 114 arises from the nature (e.g., size, shape, and material) of the objects off which the acoustic pulses 112 reflect and the distance of such objects from the speaker 102. For example, echoes 114 reflecting off a distant object will be weaker and arrive at a later point in time than echoes 114 reflecting off a closer object. In some examples, the variations in time and/or intensity of the echoes 114 detected by the microphone 104 are compared against the consistent acoustic pulses 112 detected by the microphone 104 to determine the presence and/or proximity of objects in the vicinity of the computing device 100.

In some examples, the proximity detection system of the computing device 100 is designed to detect when an object (e.g., the user's hand 110) is within an activation region 116 associated with the computing device 100. In some examples, the activation region 116 corresponds to an area within a threshold distance 118 of the computer device. The threshold distance 118 may be any suitable distance (e.g., 6 inches, 12 inches, 18 inches, 2 feet, 3 feet, etc.). If an object is detected within the activation region 116 (e.g., the object is within the threshold distance 118), the computing device 100 may activate or initiate an operation that is associated with a detected object. In some examples, the operation triggered by an object being detected within the activation region 116 includes waking up the computing device 100 from a low powered sleep state or idle state to a full powered active state.

A challenge to identifying a particular object (e.g., the user's hand 110) in the vicinity of the computing device 100 arises from the fact that the microphone 104 is likely to detect many other echoes 114 reflected off other objects in the surrounding environment of computing device 100. Furthermore, independent of the echoes 114 corresponding to the acoustic pulses 112, the environment may contain many other sources of noise (e.g., machines, people, etc.) that may also be detected by the microphone 104. Such environmental noises may supersede and/or mimic the acoustic pulses 112 and/or the echoes 114 resulting in errors in detecting an intended object such as, for example, the user's hand 110. Errors may be false negatives (in which an object in the activation region 116 is not detected) or false positives (in which an object is detected in the activation region 116 when no object is actually present). Of the two types of errors, false positives are more problematic because a false positive will trigger the operation of the computing device 100 when the user did not intend such operation to occur. Accordingly, examples disclosed herein are designed to reduce (e.g., minimize) the likelihood of a false positive occurring.

Noise is a significant challenge in the near ultrasonic frequency range (e.g., between 18 kHz and 24 kHz) because there are many sources in everyday environments that produce noises in that range. This is a primary reason why known ultrasonic proximity detection systems are typically implemented at much higher frequencies (e.g., above 40 kHz). However, as mentioned above, such techniques come at increased cost and complexity due to the need for specialized components capable of handling the high frequencies.

Figure 2:
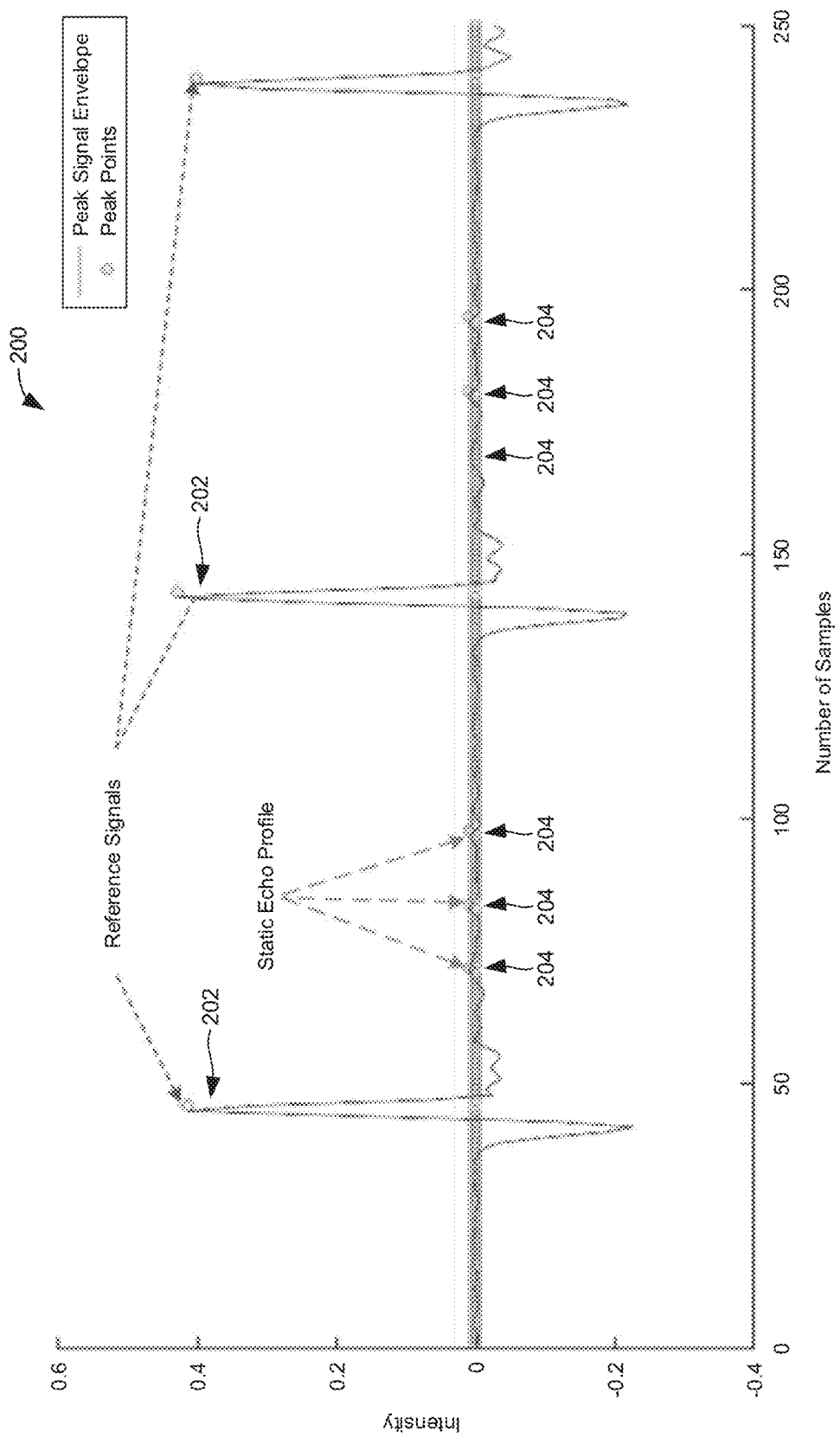
FIG. 2 illustrates an example static environment echo profile generated in accordance with teachings disclosed herein based on actual data.

Examples disclosed herein overcome the challenges of detecting objects at frequencies where a lot of noise may exist, while still using standard components already incorporated into many computing devices. In some examples, a robust and error resilient object detection scheme is accomplished by generating and storing a static environment echo profile for the environment in which the computing device 100 is located. A static environment echo profile represents the echoes 114 associated with the acoustic pulses 112 reflected off fixed (e.g., static) objects in the environment surrounding the computing device 100. An example static environment echo profile 200 based on actual data is shown in the illustrated example of FIG. 2. As shown in the illustrated example, the very tall peaks 202 in the signal stream correspond to reference signals (e.g., acoustic pulses 112 directly sensed by the microphone 104 without being reflected). A period of time after each reference signal there are much lower intensity peaks 204 corresponding to echoes 114 reflected off of fixed or static objects in the surrounding environment. The relatively low intensity of the echoes 114 and their distance from the preceding reference signal is indicative of the objects being at a relatively substantial distance from the computing device 100.

In some examples, the static environment echo profile 200 is generated as the result of several stages of preprocessing of the audio data captured by the microphone 104. For instance, in addition to directly sensing the acoustic pulses 112 (e.g., the reference signals) and the echoes 114, the microphone 104 is likely to pick up other noises generated in the environment surrounding the computing device 100. Accordingly, in some examples, the computing device 100 removes substantially all humanly audible noises by processing the input signal through one or more signal filters. In some examples, the computing device 100 processes the input signal using a band pass filter with a lower cutoff frequency of 18 kHz and an upper cutoff frequency of 24 kHz to isolate noise information captured within the near ultrasonic range as defined above. Further, in some examples, the band pass filter is implemented with a central frequency of 22 kHz and uses an elliptic infinite impulse response filter with a 1 decibel passband ripple. Further, in some examples, the output of the band pass filter is analyzed to identify significant signal peaks in the preprocessed signal (e.g., the peaks 202, 204 of FIG. 2).

Assuming that the computing device 100 does not move relative to its environment, the echoes 114 reflected off static objects in the environment should be relatively consistent over time. Thus, as shown in the illustrated example of FIG. 2, the lower intensity peaks 204 (e.g., echoes 114) after the first reference signal (the high intensity peak 202) are substantially the same (in terms of intensity and relative timing) as the lower intensity peaks 204 (e.g., echoes 114) following the second reference signal. However, if there is a non-static object in the environment (e.g., a human moving around in the same room as the computing device 100), the echoes 114 reflected off the non-static object will change in intensity and/or time of detection based on changes in the movement and/or position of the object relative to the computing device 100. Echoes 114 corresponding to non-static objects are identified as being separate from the static environment echo profile and further analyzed for the possibility of corresponding to an object within the activation region 116 of the computing device 100 as described further below.

In some examples, during an object detection process, the computing device 100 generates a full echo profile that is representative of all acoustic pulses 112 and corresponding echoes 114 detected by the microphone 104 over a most recent period of time. That is, in contrast to the static environment echo profile 200 that represents echoes from static objects in the environment, a full echo profile represents echoes from all objects (whether static or not) in the environment. A full echo profile can be expressed mathematically as follows:

$$\text{EchoProfile}[n] = \text{RefSig}[n] + \Sigma_{m=0}^{M-1} \text{echo}[m] \quad \text{(Eq. 5)}$$

where echo[m] refers to each particular echo 114 captured by the microphone 104 from the environment. A similar mathematically expression may be provided for the static environment echo profile except that the summation of echoes 114 is limited to echoes reflected from static objects in the environment.

Figure 3:
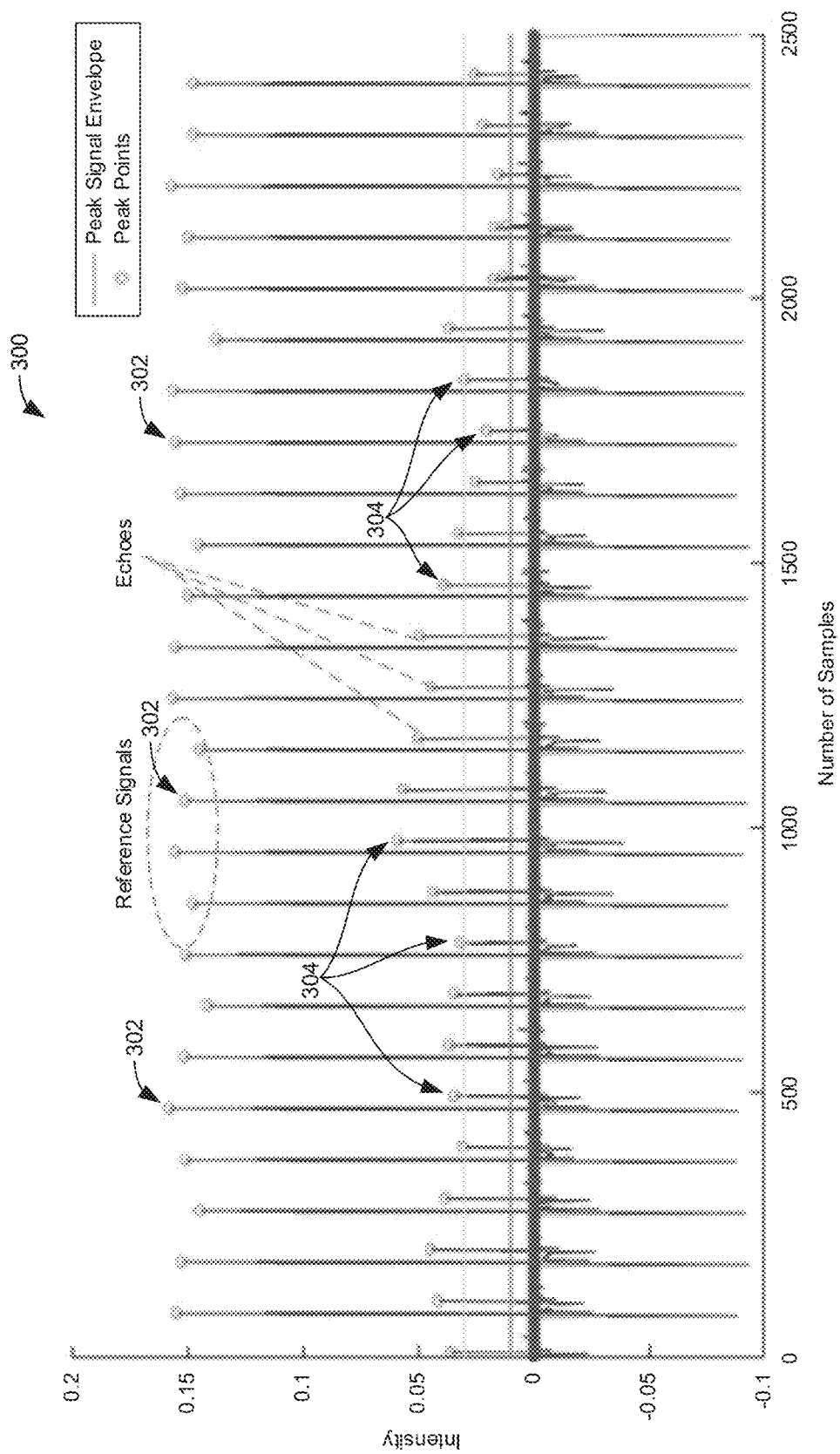
FIG. 3 illustrates an example full echo profile generated in accordance with teachings disclosed herein based on actual data.

An example full echo profile 300 based on actual data is shown in the illustrated example of FIG. 3. As with the example static environment echo profile 200 of FIG. 2, the full echo profile 300 includes high intensity peaks 302 corresponding to reference signals (associated with directly sensed acoustic pulses 112) and lower intensity peaks 304 corresponding to echoes 114 of the acoustic pulses 112. As compared with the low intensity peaks 204 in FIG. 2, the low intensity peaks 304 in FIG. 3 are considerably larger when viewed as a proportion of the intensity of the associated reference signals (e.g., the high intensity peaks 302). Further, the low intensity peaks 304 in FIG. 3 are relatively close to the preceding reference signal. The somewhat higher intensity of the low intensity peaks 304 and the relatively short duration after the corresponding reference signal is indicative of an echo 114 reflected off an object that is relatively close to the computing device 100.

As shown in FIG. 3, the intensity of the low intensity peaks 304 varies considerably from one peak to the next indicating that the object reflecting the corresponding echoes 114 is a non-static object (e.g., an object that is moving relative to the computing device 100). In this particular example, the data reflected in FIG. 3 is based on a person moving their hand away from and towards an associated computing device implementing the processes disclosed herein. It should be noted that there is also some variability in the intensity of the high intensity peaks 302 corresponding to the reference signals. In ideal conditions, the reference signals should be substantially identical in intensity as described above. However, some variability is expected due to imperfect environmental conditions and/or as a result of some measure or error introduced by the preprocessing of the input data captured by the microphone 104. While there is some variability in the intensity of the reference signals, the periodicity of the reference signals is substantially consistent over time.

In the full echo profile 300, some of the low intensity peaks 304 may correspond to echoes 114 reflected off static objects in the environment. These same echoes 114 are represented in the static environment echo profile 200. Accordingly, the presence of non-static objects in the environment can be identified by comparing and identifying the differences between the full echo profile 300 and the static environment echo profile 200. More particularly, in some examples, the static environment echo profile is subtracted from the full echo profile to remove the echoes 114 reflected off static objects. That is, the static signal data represented by the static environment echo profile is removed from the full echo profile. The output of this calculation is referred to herein as a non-static echo profile. An example non-static echo profile 400 is shown in FIG. 5. The presence of any residual echoes 114 in the non-static echo profile based on differences (above a certain threshold to account for minor variability noted above) between the static environment echo profile 200 and the full echo profile 300 serve as a trigger to implement subsequent analysis for object detection purposes as described more fully below. Thus, in some examples, the static environment echo profile 200 serves as a baseline for comparison with echoes 114 detected by the microphone 104 at any particular time to determine when additional processing and analysis is appropriate. In some examples, when a non-static object is detected and further processing and analysis is warranted, the further processing and analysis is based on the non-static echo profile to simplify the computations by first isolating the echoes 114 associated with non-static objects from static objects.

In some situations, the computing device 100 may dynamically monitor and update the static environment echo profile 200 in substantially real time based on changes to static objects in the environment (e.g., the relocation of a chair or other piece of furniture), and/or changes in the location of the computing device 100 relative to the environment (including the relocation of the computing device to a new environment). In this manner, the computing device 100 is able to adapt to any particular environment by updating the static environment echo profile to reflect current environmental conditions to increase the accuracy at which non-static objects may be identified and analyzed as described herein. In some examples, if a static environment echo profile cannot be reliably generated (or updated) due to too much variability in the echoes 114 detected by the microphone 104, the computing device 100 may enter an error state until a reliable static environment echo profile may again be generated. In some such examples, the subsequent processing of echo data may be prevented while the device is in the error state to avoid the possibility of an inaccurate detection of an object in the vicinity of the computing device 100.

As mentioned above, once a difference (that satisfies a threshold) between the static environment echo profile and the full echo profile has been detected as indicative of an echo 114 corresponding to a non-static object, the computing device 100 may initiate subsequent analysis and processing of the noise information captured by the microphone 104. In some examples, the computing device 100 may automatically switch between different modes while processing the noise information to reduce power consumption. More particularly, in some examples, when the computing device 100 initially begins analyzing the noise information, the computing device 100 may operate in a low power standby sensing mode. In some examples, the computing device 100 performs a relatively course analysis of the echo data in the standby sensing mode to determine whether the non-static object detected based on the difference between the static environment echo profile and the full echo profile is located within the activation region 116. If the computing device 100 determines that the non-static object is in the activation region 116, the computing device 100 may then switch to an active sensing mode in which a more accurate analysis is performed to confirm or validate the determination made during the standby sensing mode that the non-static object is within the activation region 116. In some examples, only after the computing device 100 has confirmed there is an object within the activation region 116 using the analysis of the active sensing mode does the computing device 100 activate or initiate the operation associated with the detection of such an object (e.g., wake up the computing device from a low power idle state).

As outlined above, in some examples, the processing of echo data captured by the microphone 104 involves a two stage process that passes through a standby sensing mode and an active sensing mode before the computing device 100 implements a particular operation in response to a detected object. The different modes associated with the separate stages in this process serve to increase the power efficiency of the system. In particular, while both modes consume relatively little power (e.g., both may be implemented while the computing device 100 is in a low power sleep state or idle state), the standby sensing mode consumes less power than the active sensing mode. In some examples, the standby sensing mode is more power efficient because the acoustic pulses 112 are generated less frequently (e.g., spaced apart at longer intervals) during the standby sensing mode than during the active sensing mode. For example, during the active sensing mode, the speaker 102 may generate eight acoustic pulses 112 every second whereas the speaker may generate fewer (e.g., 4, 2, etc.) acoustic pulses 112 every second during the standby sensing mode. The fewer acoustic pulses 112 in the standby mode reduces power consumption because the speaker 102 is being excited less frequently. Further, the standby mode uses less power because the microphone 104 is collecting less echo data to be processed. While the standby sensing mode reduces power consumption, the lower time resolution renders the standby sensing mode less accurate than during the active mode. Accordingly, in some examples, once an object within the activation region 116 has been detected in the standby mode, the system automatically switches to the active mode to confirm the object detection is accurate using a higher resolution for increased accuracy. If the active sensing mode does not confirm the presence of the object or the object is removed from within the activation region, the computing device 100 may switch back to the standby sensing mode to continue monitoring for an object in proximity to the computing device 100.

In addition to using echoes 114 based on acoustic pulses 112 generated at a shorter periodicity, the active mode also includes more complex computations than in the standby mode to increase the accuracy and resilience of object detection even in the presence of significant environmental noises. More particularly, in some examples, the object detection processing during the active stage monitors input noise levels and abnormal echoes to automatically switch between a lock-in state and a lock-out state to maintain accurate object detection while enabling relatively quick recovery from error conditions due to, for example, environmental noises that may disrupt the monitoring of the acoustic pulses 112 and/or associated echoes 114.

In some examples, the output of the speaker 102 is not synchronized or timed to the noise information collected by the microphone 104. Accordingly, the system analyzing the noise information does not have any way to directly identify when an acoustic pulse 112 is sensed directly by the microphone 104 (i.e., a reference signal) and when noises captured by the microphone 104 correspond to echoes 114 (or other environmental noise). Accordingly, the lock-out state of the active sensing mode serves to identify reference signals in the noise information that can be used to synchronize the timing of the acoustic pulses 112 and the corresponding echoes 114 going forward. In some examples, the reference signals are detected by analyzing the noise information over time until a repeating signal is identified that satisfies criteria corresponding to the repeating acoustic pulses 112. More particular, the criteria that must be satisfied for a signal to constitute a reference signal includes (1) that the signal repeats with a substantially consistent periodicity corresponding to the time interval of successive ones of the acoustic pulses 112 and (2) that the repeating signal has an intensity that is within a threshold of an expected signal level for the acoustic pulses 112. In some examples, the repeating signal must fall between an upper threshold and a lower threshold. In other examples, the repeating signal only needs to exceed a lower threshold that is higher than a maximum intensity expected for an echo 114.

In some examples, identification of the reference signals is based on an analysis of the non-static echo profile that includes signals corresponding to the acoustic pulses 112 and echoes 114 reflected from non-static objects but excludes echoes 114 of static objects that have been subtracted out from a corresponding full echo profile. Because the echoes 114 included in the analysis correspond to non-static objects, the timing at which subsequent ones of the echoes 114 are detected will not be consistent. As a result, the echoes 114 will not satisfy the first criterion of a consistent periodicity corresponding to the time interval between separate acoustic pulses. By contrast, because the acoustic pulses 112 are repeated at consistent intervals and sensed directly by the microphone 104, the acoustic pulses can be recognized as the reference signals as outlined above. In some examples, the computations of the analysis during the standby mode are simplified by ignoring the first criterion used during the active mode. That is, while both a consistent periodicity and expected intensity of signals are used to identify and track reference signals in the active mode, individual reference signals are detected independently based on their intensity without reference to their relative spacing during the standby mode. This simplified approach during the standby mode provides a rough analysis for detecting objects that may be within the activation region that can then be confirmed or validated by the more robust and accurate methodology used during the active mode. Alternatively, in some examples, the analysis during the standby mode may identify the reference signals based on their repeating nature at a consistent periodicity in a manner similar to the active mode. However, in some such examples, the references signals may be identified with a lower threshold of confidence such that the process may be performed with reduced computational power relative to the active mode.

When the computing device 100 is in the active mode and has identified the repeating reference signals (corresponding to the acoustic pulses 112) as described above, the device may be said to have "locked-in" to the reference signals and, therefore, may switch to the lock-in state. Typically, the lock-out state, during which the computing device 100 seeks for and identifies the reference signals, lasts for a relatively short duration (e.g., less than a few seconds or even shorter) corresponding to a sufficient number of repetitions of the acoustic pulses 112 to enable the device to detect the repeating sequence to verify the first criterion mentioned above. The particular duration for the lock-out state may depend on the periodicity of the acoustic pulses 112 and the amount and/or nature of noise in the environment. For instance, as shown in the example non-static echo profile 400 of FIG. 4, the first seven reference signals correspond to a lock-out period 402 and then all reference signals thereafter are associated with a lock-in period 404.

Figure 4:
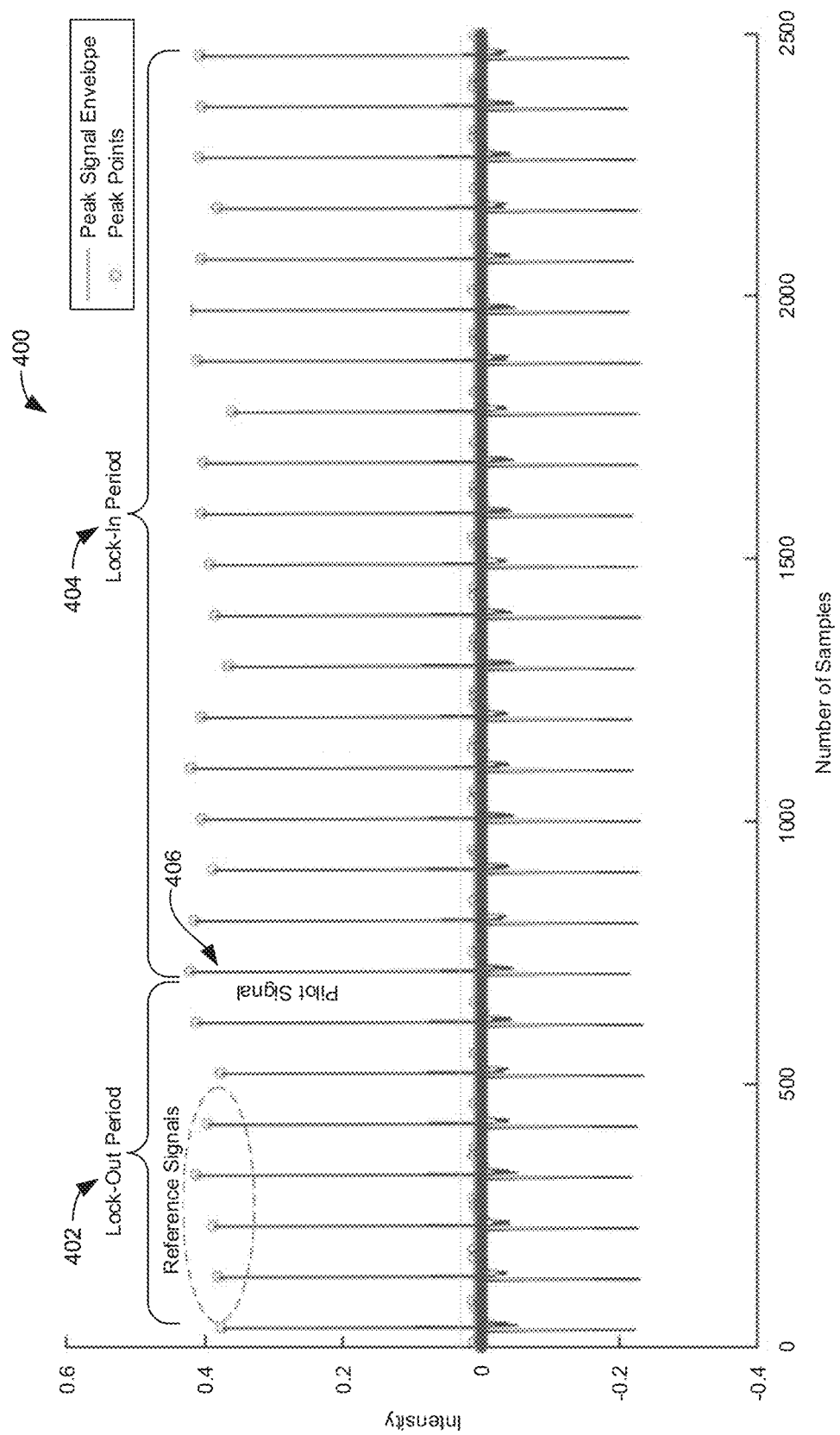
FIG. 4 illustrates an example non-static echo profile generated in accordance with teachings disclosed herein based on actual data.

In some examples, the first reference signal positively identified by the computing device 100 as satisfying the criteria indicative of a reference signal in the active mode is referred to herein as the pilot reference signal or simply pilot signal as identified by reference numeral 406 in FIG. 4. The pilot reference signal 406 is used as a reference to identify and validate subsequent reference signals identified while the computing device 100 is operating in the lock-in state. That is, even after the reference signals have been identified within the non-static echo profile, the computing device 100 continues to monitor and detect subsequent reference signals to verify that the system remains synchronized to the timing at which the speaker 102 produces the acoustic pulses 112 by detecting subsequent reference signals at the expected frequency and intensity (within a certain threshold) corresponding to parameters defined by the pilot reference signal 406. As long as the computing device 100 is able to identify and verify each successive reference signal, the device 100 remains in the lock-in state. If the computing device 100 is unable to identify a reference signal at the expected point in time (based on the fixed periodicity of the signals), the computing device 100 may revert to the lock-out state to again seek for the reference signals before returning to the lock-in state. In some examples, the computing device 100 may wait a threshold period of time after failing to identify an expected reference signal (e.g., the duration of a particular number (e.g., 2, 3, 5, etc.) of intervals of acoustic pulses 112) on the assumption that the missing reference signal(s) were lost due to an abnormal noise in the environment but can be detected again at the time expected for a subsequent reference signal.

Aside from continuing to identify subsequent reference signals, the computing device 100 also performs object depth calculations on the echoes 114 contained in the non-static echo profile being analyzed. As mentioned above, the time delay between an acoustic pulse 112 (e.g., a reference signal) and an echo 114 of the acoustic pulse 112 is proportional to the distance of the object reflecting the echo 114. As a result, by determining the time between a reference signal and a following echo, the computing device 100 may determine the distance of an associated object from the computing device 100. This can be expressed mathematically as follows:

EchoDuration[m]=EchoTime[m]−ReferenceTime[n]  (Eq. 6)

EchoDepth[m]=EchoDuration[m]/DepthScaleFactor  (Eq. 7)

where ReferenceTime[n] is the time index of the reference signal preceding the particular echo 114 being analyzed, and EchoTime[m] is the time index of the particular echo 114. For the above equations to work, it is assumed that Echo-Time[m] is greater than ReferenceTime[n], which necessarily assumes that EchoDuration[m] is greater than 0. In some examples, when the calculated distance of an object (e.g., EchoDepth[m]) is less than the threshold distance 118 for the activation region 116, the computing device 100 may generate an output that causes the activation or initiation of an operation associated with an object being detected in the activation region 116.

Experimental testing has shown that teachings disclosed herein provide accurate and robust results regardless of the level or nature of noise in the environment. Particular test results are shown in the table 500 of FIG. 5. As shown in the table 500, accuracy remained at or above 90% across all different types of noise. Further, false positives did not occur under any type of noise conditions. As mentioned above, examples disclosed herein are specifically designed to reduce (e.g., prevent) false positives from occurring because a false positive means that an object was incorrectly detected as being within the activation region 116 of FIG. 1, thereby incorrectly triggering the operation associated with the presence of an object.

Figure 6:
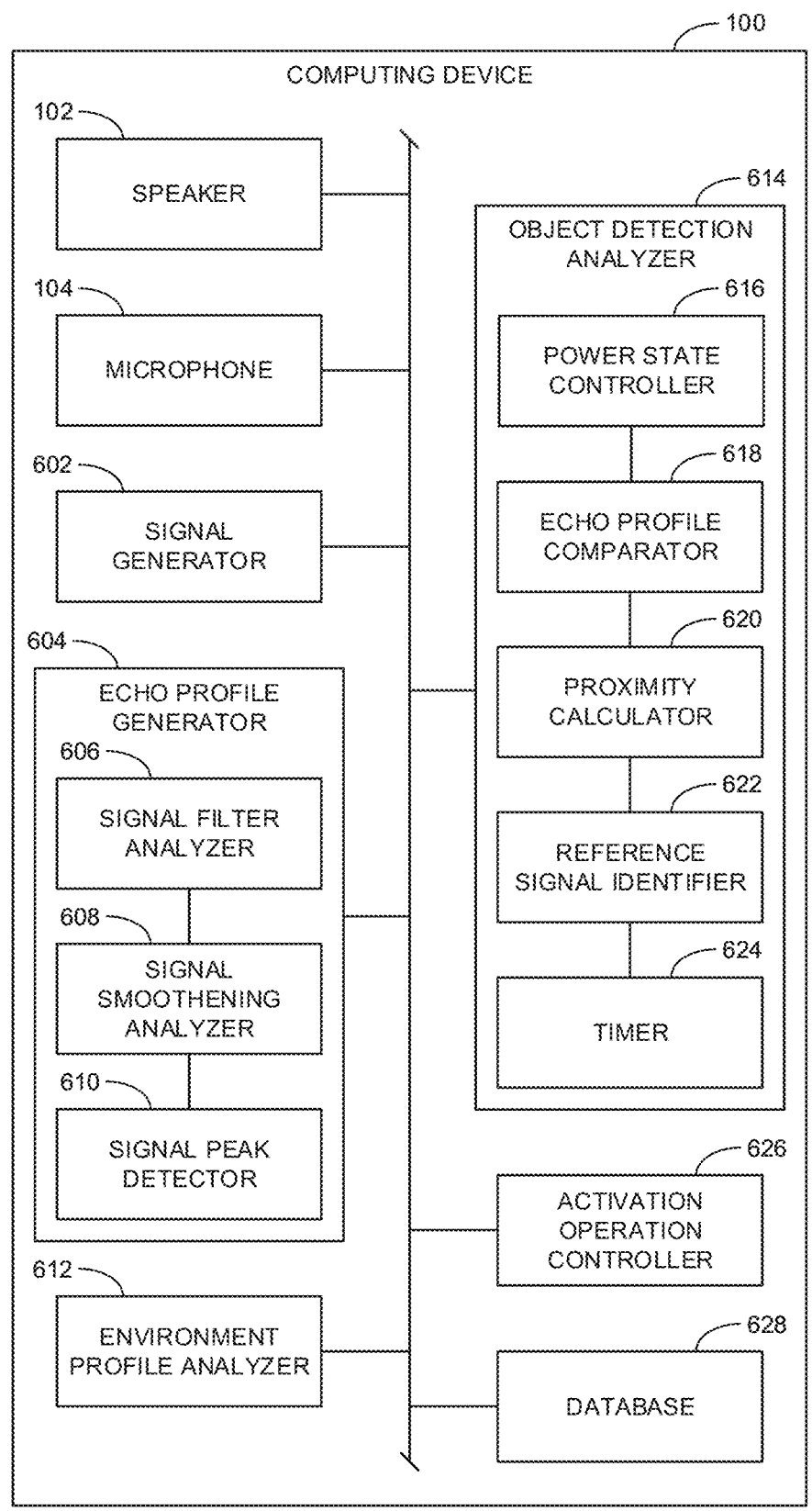
FIG. 6 illustrates an example implementation of the example computing device of FIG. 1.

FIG. 6 illustrates an example implementation of the example computing device 100 of FIG. 1. As shown in the illustrated example, the computing device 100 includes the example speaker 102, the example microphone 104, an example signal generator 602, an example echo profile generator 604 (that includes an example signal filter analyzer 606, an example signal smoothening analyzer 608, and an example signal peak detector 610), an example environment profile analyzer 612, an example object detection analyzer 614 (that includes an example power state controller 616, an example echo profile comparator 618, an example proximity calculator 620, an example reference signal identifier 622, and an example timer 624), an example activation operation controller 626, and an example database 628.

The example signal generator 602 controls the excitation of the speaker 102 to produce the acoustic pulses 112 at fixed intervals corresponding to the current sensing mode (e.g., active or standby) in which the computing device 100 is operating. In some examples, the signal generator 602 generates acoustic pulses based on Equations 1-4 outlines above. In some examples, to reduce computational burdens, the signal generator 602 simply causes a recording of the acoustic pulses 112 to be played at the relevant periodicity. In such examples, the recording may be stored in the example database 628.

The example echo profile generator 604 of FIG. 6 performs the preprocessing of noise information captured by the microphone 104 to generate echo profiles associated with the current circumstances of the computing device 100. As shown in the illustrated example, the signal filter analyzer 606 processes the noise information based on one or more filters. In some examples, the filters include a band pass filter to remove all data outside of the near ultrasonic range (e.g., between 18 kHz and 24 kHz). The example signal smoothening analyzer 608 analyzes the noise information to define the signal envelope for the signal samples contained in the noise information. The example signal peak detector 610 analyzes the noise information to identify significant peaks within the noise information. The output of the echo profile generator 604 corresponds to the full echo profile associated with the current environment in which the computing device 100 is located. In some examples, the full echo profile is stored in the example database 628.

In some examples, the environment profile analyzer 612 uses the full echo profile to generate a static environment echo profile that is limited to reference signals and echoes 114 reflected off of static objects in the environment. In some examples, the static environment echo profile is stored in the example database 628. In some examples, when there are no non-static objects in the environment, the static environment echo profile is the same as the full echo profile. Accordingly, in some examples, the environment profile analyzer 612 may simply store the full echo profile as the static environment echo after confirming there are no non-static objects represented in the profile. In other examples, where non-static objects are present in the environment, the example environment profile analyzer 612 may identify and remove echoes 114 corresponding to the non-static objects before storing the static environment echo profile. Further, in some examples, the environment profile analyzer 612 monitors changes to the full echo profile (as output by the echo profile generator 604) to determine whether there are changes to the static environment. If so, the environment profile analyzer 612 may update the static environment echo profile. In some examples, the circumstances associated with the computing device 100 at any given point in time may be such that the static environment echo profile cannot be reliably generated and/or updated due, for example, to frequent changes in the static environment and/or overly noisy conditions. In some such examples, the environment profile analyzer 612 may enter an error state to prevent inaccurate depth sensing and processing to occur based on an invalid static environment echo profile.

The example object detection analyzer 614 analyzes echo profiles generated by the echo profile generator 604 and the environment profile analyzer 612 to identify objects within the vicinity of the computing device 100. More particular, in some examples, the object detection analyzer 614 is interested in determining whether an object with within the activation region 116 of the computing device 100. As described above, in some examples, object detection may be done in two stages corresponding to different power modes for the object detection analyzer including a standby sensing mode and an active sensing mode. In the illustrated example, the power state controller 616 determines and controls when the object detection analyzer 614 is to operate in the standby mode and when to operate in the active mode. The example echo profile comparator 618 compares the current full echo profile with the current static echo profile to identify any differences. Differences between the full echo profile and the current static echo profile may be indicative of a non-static object within the environment. Accordingly, when differences are identified, the echo profile comparator 618 causes subsequent processing and analysis to confirm whether the non-static object is within the activation region 116. In some examples, the echo profile comparator 618 subtracts the static environment echo profile from the full echo profile to generate a non-static echo profile that is used during the subsequent analysis and processing.

The example proximity calculator 620 determines a proximity or distance of an object reflecting an echo 114 represented in the non-static echo profile based on the duration of time between a particular reference signal in the profile and a following echo signal. The example reference signal identifier 622 identifies and tracks reference signals as they occur in the non-static echo profile to maintain synchronization with the timing of when the acoustic pulses 112 (associated with the reference signals) are generated by the speaker 102. As described above, the active mode is associated with two internal states including the lock-in state and the lock-out state. The example reference signal identifier 622 determines when and whether the object detection analyzer 614 is to switch between the lock-in and lock-out states based on whether the reference signals can be identified from the input stream of the microphone 104. In some examples, switching from the lock-in state to the lock-out state after the reference signals are lost is based on the elapsing of a threshold period of time determined by the example timer 624.

The example activation operation controller 626 implements or causes to be implemented an operation in the computing device 100 in response to the object detection analyzer 614 determining an object is within the activation region 116 of the computing device 100. In some examples, the operation includes waking up the computing device 100 from a low power sleep state or idle state to a full power active state.

While an example manner of implementing the computing device 100 of FIG. 1 is illustrated in FIG. 6, one or more of the elements, processes and/or devices illustrated in FIG. 6 may be combined, divided, re-arranged, omitted, eliminated and/or implemented in any other way. Further, the example speaker 102, the example microphone 104, the example signal generator 602, the example echo profile generator 604, the example signal filter analyzer 606, the example signal smoothening analyzer 608, the example signal peak detector 610, the example environment profile analyzer 612, the example object detection analyzer 614, the example power state controller 616, the example echo profile comparator 618, the example proximity calculator 620, the example reference signal identifier 622, the example timer 624, the example activation operation controller 626, the example database 628 and/or, more generally, the example computing device 100 of FIG. 1 may be implemented by hardware, software, firmware and/or any combination of hardware, software and/or firmware. Thus, for example, any of the example speaker 102, the example microphone 104, the example signal generator 602, the example echo profile generator 604, the example signal filter analyzer 606, the example signal smoothening analyzer 608, the example signal peak detector 610, the example environment profile analyzer 612, the example object detection analyzer 614, the example power state controller 616, the example echo profile comparator 618, the example proximity calculator 620, the example reference signal identifier 622, the example timer 624, the example activation operation controller 626, the example database 628 and/or, more generally, the example computing device 100 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example speaker 102, the example microphone 104, the example signal generator 602, the example echo profile generator 604, the example signal filter analyzer 606, the example signal smoothening analyzer 608, the example signal peak detector 610, the example environment profile analyzer 612, the example object detection analyzer 614, the example power state controller 616, the example echo profile comparator 618, the example proximity calculator 620, the example reference signal identifier 622, the example timer 624, the example activation operation controller 626, and/or the example database 628 is/are hereby expressly defined to include a non-transitory computer readable storage device or storage disk such as a memory, a digital versatile disk (DVD), a compact disk (CD), a Blu-ray disk, etc. including the software and/or firmware. Further still, the example computing device 100 of FIG. 1 may include one or more elements, processes and/or devices in addition to, or instead of, those illustrated in FIG. 6, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

A flowchart representative of example hardware logic, machine readable instructions, hardware implemented state machines, and/or any combination thereof for implementing the computing device 100 of FIGS. 1 and/or 6 is shown in FIGS. 7-10. The machine readable instructions may be one or more executable programs or portion(s) of an executable program for execution by a computer processor such as the processor 1112 shown in the example processor platform 1100 discussed below in connection with FIG. 11. The program may be embodied in software stored on a non-transitory computer readable storage medium such as a CD-ROM, a floppy disk, a hard drive, a DVD, a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowcharts illustrated in FIGS. 7-10, many other methods of implementing the example computing device 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIGS. 7-10 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 7:
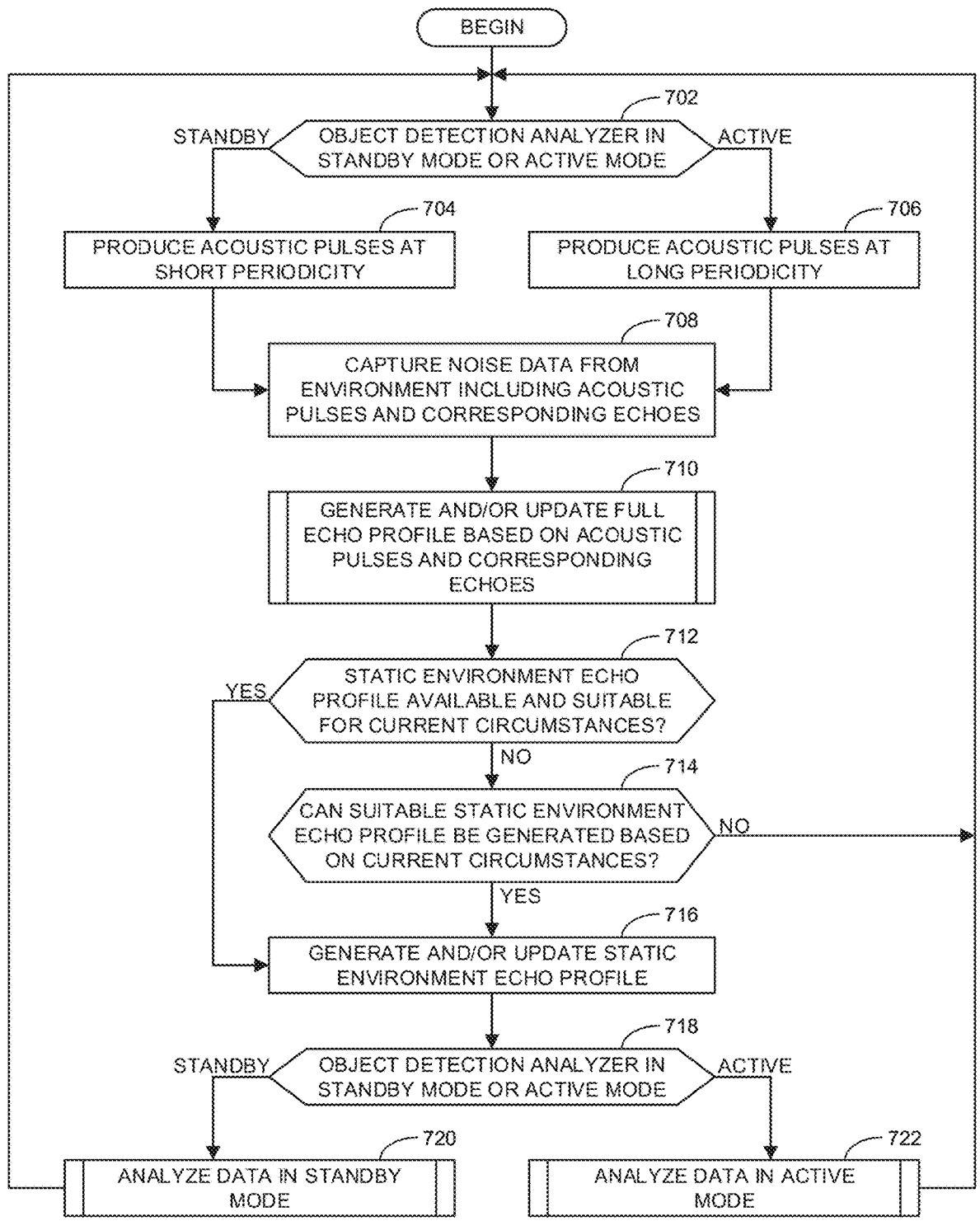
FIGS. 7-10 are flowcharts representative of example machine readable instructions that may be executed to implement the example computing device of FIGS. 1 and/or 6.

The example process of FIG. 7 begins at block 702 where the example power state controller 616 determines whether the object detection analyzer 614 is in the standby mode or the active mode. In some examples, when the process first begins, the object detection analyzer 614 begins in the standby mode. If the object detection analyzer 614 is in the standby mode, control advances to block 704 where the speaker 102 produces acoustic pulses (e.g., the acoustic pulses 112) at a long periodicity. As used in this context, the term "long periodicity" is used in a relative sense to the "short periodicity" discussed at block 706. As described above, the acoustic pulses 112 may be generated based on signals from the example signal generator 602. In some examples, the long periodicity of the acoustic pulses 112 in the standby mode corresponds to a period of fixed interval between successive pulses of 250 milliseconds or four times per second. In other examples, the period may be 500 milliseconds or twice per second. After producing the acoustic pulses 112 at block 704, control advances to block 708. Returning to block 702, if the object detection analyzer 614 is in the active mode, control advances to block 706 where the speaker 102 produces acoustic pulses 112 at a short periodicity. In some examples, the short periodicity corresponds to a period or fixed interval between pulses of 125 milliseconds or eight times per second. After producing the acoustic pulses 112 at block 706, control advances to block 708.

At block 708, the example microphone captures noise information from environment including the acoustic pulses 112 and corresponding echoes (e.g., the echoes 114). At block 710, the example echo profile generator 604 generates and/or updates a full echo profile (e.g., the full echo profile 300 of FIG. 3) based on the acoustic pulses 112 and the corresponding echoes 114. Further detail regarding the implementation of block 710 is provided below in connection with FIG. 8. At block 712, the example environment profile analyzer 612 determines whether a static environment echo profile (e.g., the static environment echo environment 200 of FIG. 2) is available and suitable for the current circumstances. If not, control advances to block 714 where the example environment profile analyzer 612 determines whether a suitable static environment echo profile can be generated based on current circumstances. If not, the example environment profile analyzer 612 enters an error state and prevents the process from proceeding by passing control back to block 702. If a suitable static environment echo profile 200 can be generated (block 714), control advances to block 716 where the example environment profile analyzer 612 generates and/or updates the static environment echo profile 200. Returning to block 712, if the static environment echo profile 200 is available and suitable for the current circumstances, control advances directly to block 716 to update the static environment echo profile 200. In some such examples, if the currently available static environment echo profile 200 does not need updating, block 716 may be skipped.

At block 718, the example power state controller 616 determines whether the object detection analyzer 614 is in standby mode or active mode. If the object detection analyzer 614 is in the standby mode, control advances to block 720 where the example object detection analyzer 614 analyzes the data in the standby mode. Further detail regarding the implementation of block 720 is provided below in connection with FIG. 9. If the object detection analyzer 614 is in the active mode, control advances to block 722 where the example object detection analyzer 614 analyzes the data in the active mode. Further detail regarding the implementation of block 722 is provided below in connection with FIG. 10. After the completion of blocks 720 and 722 (described further below), control returns to block 702 to continue the example process.

Figure 8:
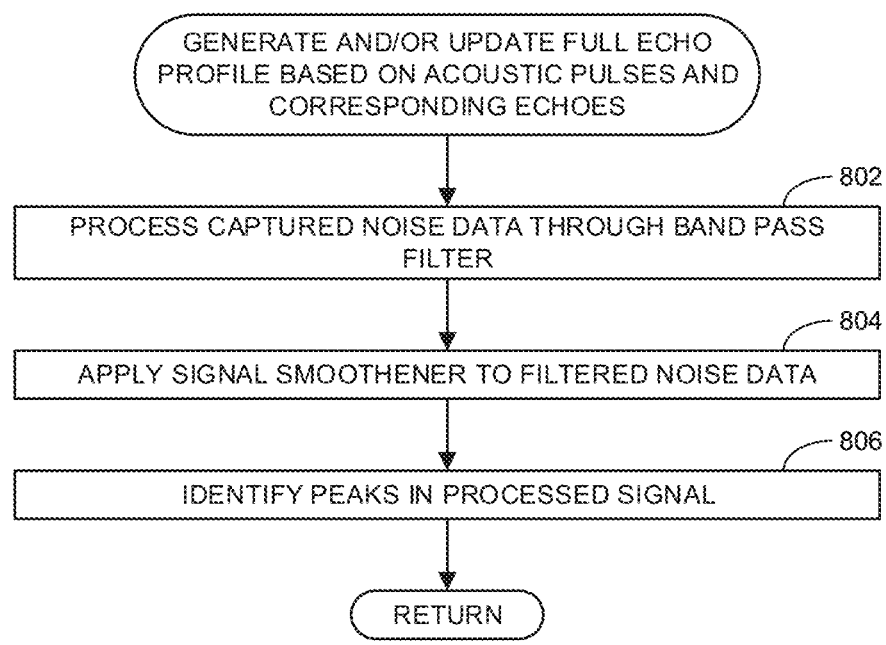

FIG. 8 illustrates an example implementation of block 710 of FIG. 7 to generate and/or update a full echo profile. The example process of FIG. 8 begins at block 802 where the example signal filter analyzer 606 processes the captured noise information through a band pass filter. At block 804, the example signal smoothening analyzer 608 applies a signal smoothener to the filtered noise information. At block 806, the example signal peak detector 610 identifies peaks in the processed signal. Thereafter, the example process of FIG. 8 ends and returns to continue with the process of FIG. 7.

Figure 9:
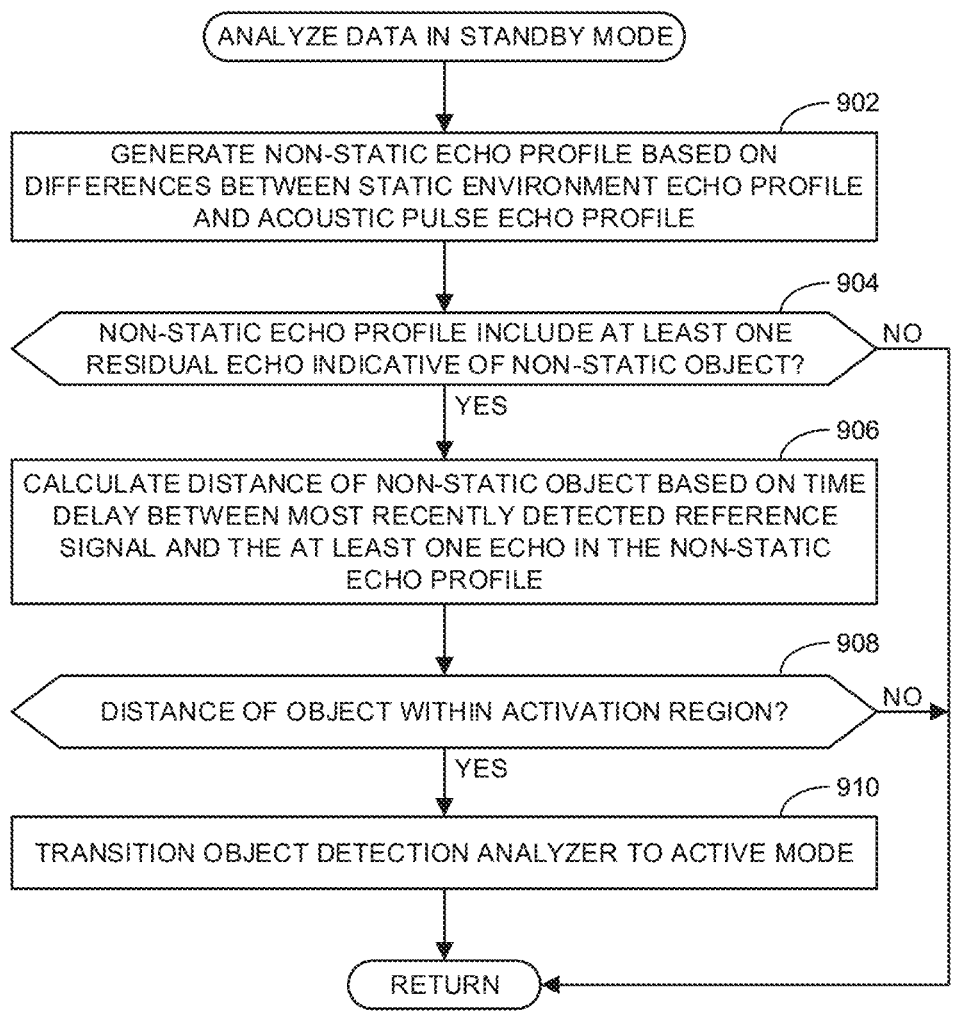

FIG. 9 illustrates an example implementation of block 720 of FIG. 7 to analyze data in the standby mode. The example process of FIG. 9 begins at block 902 where the example echo profile comparator 618 generates a non-static echo profile based on the differences between the static environment echo profile 200 and the full echo profile 300. In some examples, the non-static echo profile corresponds to the static environment echo profile subtracted from the full echo profile. At block 904, the example echo profile comparator 618 determines whether the non-static echo profile includes at least one residual echo indicative of a non-static object. If not, the example process of FIG. 9 ends and returns to continue the process of FIG. 7. If so, control advances to block 906 where the example proximity calculator 620 calculates the distance of the non-static object based on the time delay between the most recently detected reference signal and the at least one echo in the non-static echo profile. At block 908, the example proximity calculator 620 determines whether the distance of the object is within an activation region (e.g., the activation region 116 of FIG. 1). In some examples, the distance of the object is determined to be within the activation region when the distance is less than a threshold distance 118 defining the activation region 116. If the distance of the object is not within the activation region 116, the example process of FIG. 9 ends and returns to continue the process of FIG. 7. If the distance of the object is within the activation region 116, control advances to block 910 where the example power state controller 616 transitions the object detection analyzer 614 to the active mode. Thereafter, the example process of FIG. 9 ends and returns to continue with the process of FIG. 7.

Figure 10:
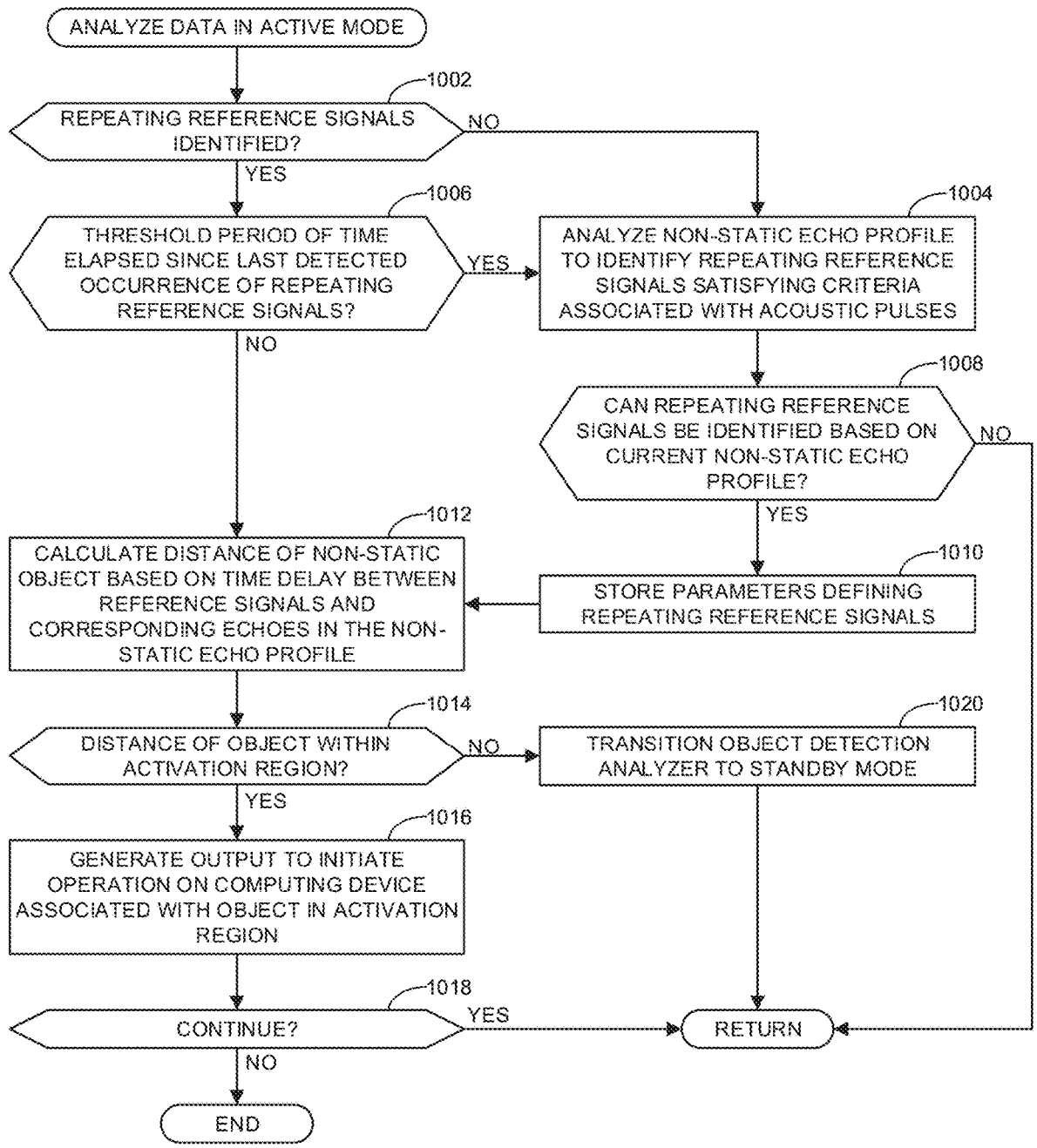

FIG. 10 illustrates an example implementation of block 722 of FIG. 7 to analyze data in the active mode. The example process of FIG. 10 begins at block 1002 where the example reference signal identifier 622 determines whether repeating reference signals have been identified. If the reference signal identifier 622 determines that repeating reference signals have not been identified (indicative of the lock-out state described above), control advances to block 1004 where the example reference signal identifier 622 analyzes the non-static echo profile to identify repeating reference signals satisfying the criteria associated with the acoustic pulses 112. As described above, in some examples, the criteria include that the intensity of the signals satisfy a threshold and that the signals have a fixed periodicity corresponding to the interval between the acoustic pulses 112. If, at block 1002, the reference signal identifier 622 determines that repeating reference signals have been identified (indicative of the lock-in state described above), control advances to block 1006 where the example reference signal identifier 622 determines whether a threshold period of time has elapsed since the last detected occurrence of the repeating reference signals. In some examples, the threshold period of time may be longer than the fixed interval between successive ones of the acoustic pulses 112. As such, the threshold period of time having elapsed indicates that one or more references signals was not detected when expected to the point where the object detection analyzer 614 needs to revert to the lock-out state to again search for the reference signals. Accordingly, in such a situation, control advance to block 1004 to again identify the repeating reference signals.

At block 1008, the example reference signal identifier 622 determines whether the repeating reference signals can be identified based on the current non-static echo profile. In some examples, there may not be enough data (e.g., enough cycles of the acoustic pulse 112) to reliable identify the reference signals. Thus, if the repeating reference signals cannot be identified, the example process of FIG. 10 ends and returns to continue the process of FIG. 7 to gather additional noise information including additional acoustic pulses. If the repeating reference signals can be identified at block 1008, control advances to block 1010 where the example database stores parameters defining the repeating reference signals. In some examples, the parameters are defined by a pilot reference signal (e.g., the pilot reference signal 406). Thereafter, control advances to block 1012. Returning to block 1006, if the threshold period of time has not elapsed, control advances directly to block 1012.

At block 1012, the example proximity calculator 620 calculates the distance of the non-static object based on the time delay between the reference signals and the corresponding echoes 114 in the non-static echo profile. In some examples, multiple distance calculations are performed for multiple successive echoes 114 associated with multiple successive reference signals. The multiple data points serve to increase the accuracy and reliability of the output. Furthermore, as this process is associated with the active mode when the acoustic pulses 112 are produced at a relatively short periodicity, there is a smaller time resolution to further increase the accuracy of the analysis. At block 1014, the example proximity calculator 620 determines whether the distance of the object is within the activation region 116. If so, control advances to block 1016 where the example activation operation controller 626 generates an output to initiate an operation on the computing device 100 associated with object being detected within the activation region. In some examples, the operation includes waking up the computing device 100 from a sleep or idle state.

At block 1018, it is determined whether to continue the process. If so, the example process of FIG. 9 ends and returns to continue with the process of FIG. 7. Otherwise, the example process of FIG. 9 ends as does the higher level process of FIG. 7. Returning to block 1014, if the example proximity calculator 620 determines that the distance of the object is not within the activation region 116, control advances to block 1020 where the example power state controller 616 transitions the object detection analyzer 614 to the standby mode. Thereafter, the example process of FIG. 9 ends and returns to continue with the process of FIG. 7.

Figure 11:
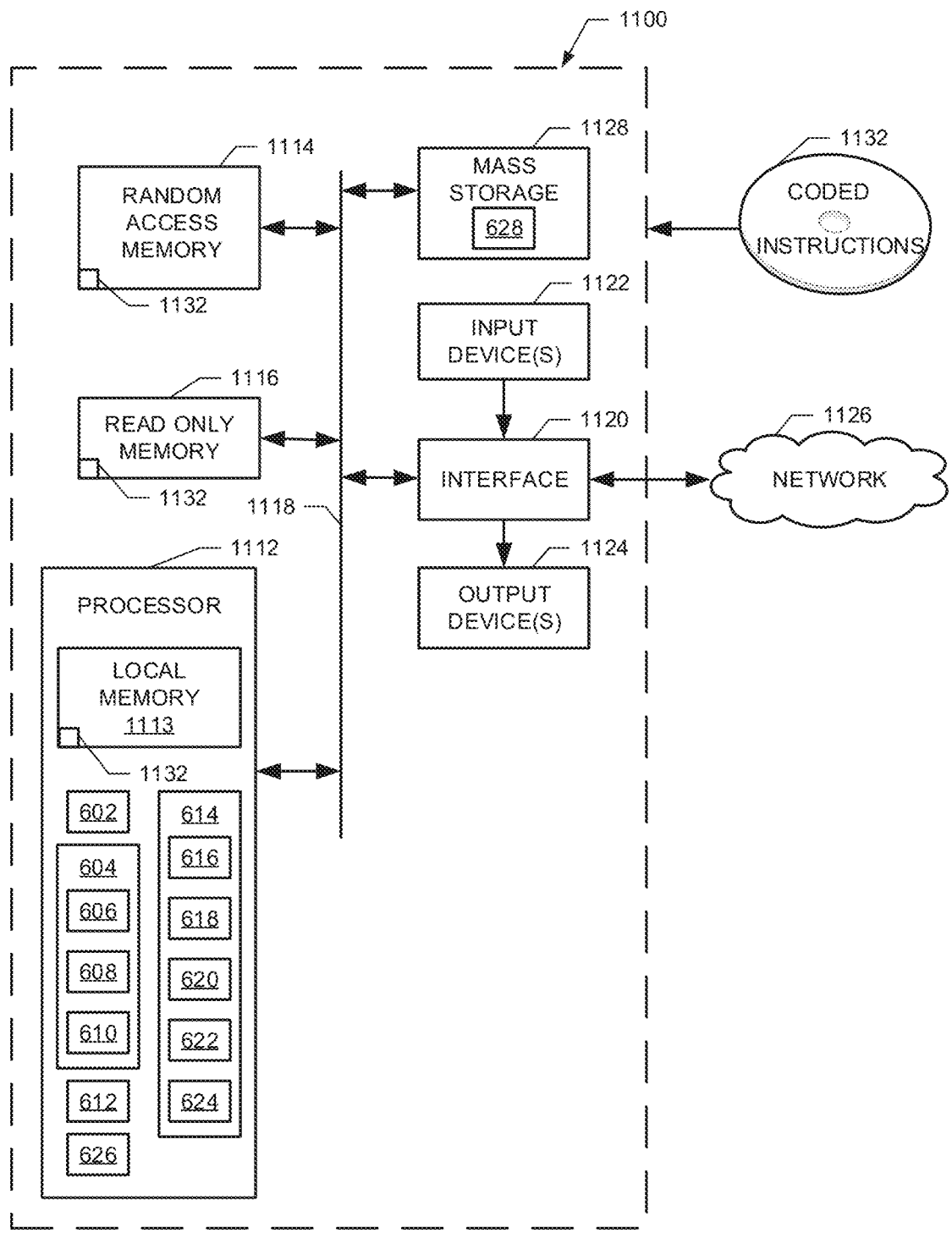
FIG. 11 is a block diagram of an example processing platform structured to execute the example instructions of FIGS. 7-10 to implement the example computing device of FIGS. 1 and/or 6.

FIG. 11 is a block diagram of an example processor platform 1100 structured to execute the instructions of FIGS. 7-10 to implement the computing device 100 of FIGS. 1 and/or 6. The processor platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a headset or other wearable device, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example signal generator 602, the example echo profile generator 604, the example signal filter analyzer 606, the example signal smoothening analyzer 608, the example signal peak detector 610, the example environment profile analyzer 612, the example object detection analyzer 614, the example power state controller 616, the example echo profile comparator 618, the example proximity calculator 620, the example reference signal identifier 622, the example timer 624, and the example activation operation controller 626.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), a Bluetooth® interface, a near field communication (NFC) interface, and/or a PCI express interface.

In the illustrated example, one or more input devices 1122 are connected to the interface circuit 1120. The input device(s) 1122 permit(s) a user to enter data and/or commands into the processor 1112. The input device(s) can be implemented by, for example, an audio sensor, a microphone (e.g., the microphone 104 of FIGS. 1 and/or 6), a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker (e.g., the speaker 102 of FIGS. 1 and/or 6). The interface circuit 1120 of the illustrated example, thus, typically includes a graphics driver card, a graphics driver chip and/or a graphics driver processor.

The interface circuit 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1126. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, redundant array of independent disks (RAID) systems, and digital versatile disk (DVD) drives. In this example, the mass storage device 1128 implements the example database 628.

The machine executable instructions 1132 of FIGS. 7-10 may be stored in the mass storage device 1128, in the volatile memory 1114, in the non-volatile memory 1116, and/or on a removable non-transitory computer readable storage medium such as a CD or DVD.

From the foregoing, it will be appreciated that example methods, apparatus and articles of manufacture have been disclosed that enable the robust and error resilient detection of objections within the vicinity of a computing device based on near ultrasonic sound waves (e.g., at frequencies ranging between 18 kHz and 24 kHz) despite the presence of environmental noises that are common at such frequencies. Further, examples disclosed herein are able to achieve reliably results using standard speakers, microphones, and processing circuitry commonly used in many computing devices today, thereby reducing costs relative to other methodologies that require specialized components. Further, examples disclosed herein are more power efficient than other known methodologies, thereby enabling examples disclosed herein to be implemented on a computing device that is in a low power idle state or sleep state. The disclosed methods, apparatus and articles of manufacture improve the efficiency of using a computing device by implementing an adaptive multi-stage objection detection scheme that automatically switches between a low power and low compute standby mode and a slightly higher power and higher compute active mode (though still sufficiently low powered for implementation while the device is in an inactive sleep state). The disclosed methods, apparatus and articles of manufacture are accordingly directed to one or more improvement(s) in the functioning of a computer.

Example methods, apparatus, systems, and articles of manufacture to detect proximity of objects to computing devices using near ultrasonic sound waves are disclosed herein. Further examples and combinations thereof include the following:

Example 1 includes an apparatus comprising a signal generator to cause a speaker of a computing device to produce a series of pulses, successive ones of the pulses spaced at fixed intervals, ones of the pulses having a central frequency between 18 kHz and 24 kHz, an echo profile generator to process noise information sensed by a microphone of the computing device, the noise information including the pulses and echoes of the pulses reflected off objects in a vicinity of the computing device, and an object detection analyzer to determine whether a first object is within an activation region associated with the computing device based on the pulses and the echoes sensed by the microphone.

Example 2 includes the apparatus of example 1, further including an activation operation controller to, in response to the detection of the first object within the activation region, implement an operation in the computing device.

Example 3 includes the apparatus of example 2, wherein the operation includes transitioning the computing device from a first state to a second state, the first state being a lower power state than the second state.

Example 4 includes the apparatus of any one of examples 1-3, further including an environment profile analyzer to generate a static environment echo profile based on ones of the echoes reflected off static objects in the vicinity of the computing device, the object detection analyzer to compare the echoes to the static environment echo profile, and identify a presence of the first object based on the comparison.

Example 5 includes the apparatus of example 4, wherein the environment profile analyzer is to identify a change in the environment based on the echoes sensed by the microphone, and update the static environment echo profile based on the change in the environment.

Example 6 includes the apparatus of any one of examples 4 or 5, wherein the echo profile generator is to generate a full echo profile based on the pulses and the corresponding echoes sensed by the microphone, the object detection analyzer is to remove static data corresponding to the static environment echo profile from the full echo profile to generate a non-static echo profile, and determine whether the first object is within the activation region based on the non-static echo profile.

Example 7 includes the apparatus of any one of examples 1-6, wherein the signal generator is to cause the speaker to produce successive ones of the pulses spaced at first fixed intervals during a first time period and to, in response to the object detection analyzer detecting the first object within the activation region during the first time period, cause the speaker to produce additional ones of the pulses spaced at second fixed intervals during a second time period after the first time period, the second fixed intervals being shorter than the first fixed intervals, the object detection analyzer to verify the first object is within the activation region based on the pulses and corresponding echoes sensed during the second time period.

Example 8 includes the apparatus of example 7, wherein the signal generator is to, in response to the object detection analyzer no longer detecting the first object within the activation region during the second time period, cause the speaker to produce additional ones of the pulses spaced at the first fixed intervals during a third time period after the second time period.

Example 9 includes the apparatus of any one of examples 1-8, wherein the echo profile generator is to generate a full echo profile based on the pulses and the corresponding echoes sensed by the microphone, and identify peaks in the full echo profile, different ones of the peaks corresponding to either the pulses or the corresponding echoes, the object detection analyzer to identify repeating reference signals based on the peaks identified in the full echo profile, the repeating reference signals corresponding to the pulses sensed by the microphone, identify an echo signal between separate occurrences of the repeating reference signals, the echo signal corresponding to one of the echoes, and determine whether the first object is within the activation region based on a time difference between the echo signal and a preceding one of the repeating reference signals.

Example 10 includes the apparatus of example 9, wherein the object detection analyzer is to identify the repeating reference signals by identifying a first subset of the peaks associated with an intensity that satisfy a threshold, and identifying a second subset of the peaks from among the first subset that are detected at a periodicity corresponding to the fixed intervals of the pulses.

Example 11 includes the apparatus of any one of examples 9 or 10, wherein the object detection analyzer is to identify the repeating reference signals at a first point in time, verify whether subsequent ones of the peaks identified after the first point in time are associated with an intensity and a periodicity corresponding to subsequent occurrences of the repeating reference signals, in response to verification that the subsequent ones of the peaks correspond to the subsequent occurrences of the repeating reference signals, determine whether the first object is within the activation region, and in response to an inability to verify that the subsequent ones of the peaks correspond to the subsequent occurrences of the repeating reference signals, inhibit the determination of whether the first object is within the activation region until the repeating reference signals are again identified at a second point in time.

Example 12 includes a method comprising producing, via a speaker of a computing device, a series of pulses, successive ones of the pulses spaced at fixed intervals, ones of the pulses having a central frequency between 18 kHz and 24 kHz, sensing, via a microphone of the computing device, the pulses and echoes of the pulses reflected off objects in a vicinity of the computing device, and determining, by executing an instruction with at least one processor, whether a first object is within an activation region associated with the computing device based on the pulses and the echoes sensed by the microphone.

Example 13 includes the method of example 12, further including, in response to the determination of the first object being within the activation region, implementing an operation in the computing device.

Example 14 includes the method of example 13, wherein implementing the operation includes transitioning the computing device from a first state to a second state, the first state being a lower power state than the second state.

Example 15 includes the method of any one of examples 12-14, further including generating a static environment echo profile based on ones of the echoes reflected off static objects in the vicinity of the computing device, comparing the echoes to the static environment echo profile, and identifying a presence of the first object based on the comparison.

Example 16 includes the method of example 15, further including identifying a change in the environment based on the echoes sensed by the microphone, and updating the static environment echo profile based on the change in the environment.

Example 17 includes the method of any one of examples 15 or 16, further including generating a full echo profile based on the pulses and the corresponding echoes sensed by the microphone, removing static data corresponding to the static environment echo profile from the full echo profile to generate a non-static echo profile, and determining whether the first object is within the activation region based on the non-static echo profile.

Example 18 includes the method of any one of examples 12-17, further including producing successive ones of the pulses spaced at first fixed intervals during a first time period, detecting the first object within the activation region based on the pulses and corresponding echoes sensed during the first time period, in response to detecting the first object within the activation region during the first time period, producing additional ones of the pulses spaced at second fixed intervals during a second time period after the first time period, the second fixed intervals being shorter than the first fixed intervals, and verifying the first object is within the activation region based on the pulses and corresponding echoes sensed during the second time period.

Example 19 includes the method of example 18, further including, in response to no longer detecting the first object within the activation region during the second time period, producing additional ones of the pulses spaced at the first fixed intervals during a third time period after the second time period.

Example 20 includes the method of any one of examples 12-19, further including generating a full echo profile based on the pulses and the corresponding echoes sensed by the microphone, identifying peaks in the full echo profile, different ones of the peaks corresponding to either the pulses or the corresponding echoes, identifying repeating reference signals based on the peaks identified in the full echo profile, the repeating reference signals corresponding to the pulses sensed by the microphone, identifying an echo signal between separate occurrences of the repeating reference signals, the echo signal corresponding to one of the echoes, and determining whether the first object is within the activation region based on a time difference between the echo signal and a preceding one of the repeating reference signals.

Example 21 includes the method of example 20, wherein the identifying the repeating reference signals includes identifying a first subset of the peaks associated with an intensity that satisfy a threshold, and identifying a second subset of the peaks from among the first subset that are detected at a periodicity corresponding to the fixed intervals of the pulses.

Example 22 includes the method of any one of examples 20 or 21, further including identifying the repeating reference signals at a first point in time, verifying whether subsequent ones of the peaks identified after the first point in time are associated with an intensity and a periodicity corresponding to subsequent occurrences of the repeating reference signals, in response to verification that the subsequent ones of the peaks correspond to the subsequent occurrences of the repeating reference signals, determining whether the first object is within the activation region, and in response to an inability to verify that the subsequent ones of the peaks correspond to the subsequent occurrences of the repeating reference signals, inhibiting the determination of whether the first object is within the activation region until the repeating reference signals are again identified at a second point in time.

Example 23 includes a non-transitory computer readable medium comprising instructions that, when executed, cause a computing device to at least produce a series of pulses, successive ones of the pulses spaced at fixed intervals, ones of the pulses having a central frequency between 18 kHz and 24 kHz, sense the pulses and echoes of the pulses reflected off objects in a vicinity of the computing device, and determine whether a first object is within an activation region associated with the computing device based on the pulses and the echoes.

Example 24 includes the non-transitory computer readable medium of example 23, wherein the instructions further cause the computing device to, in response to the determination of the first object being within the activation region, implement an operation in the computing device.

Example 25 includes the non-transitory computer readable medium of example 24, wherein the operation includes transitioning the computing device from a first state to a second state, the first state being a lower power state than the second state.

Example 26 includes the non-transitory computer readable medium of any one of examples 23-25, wherein the instructions further cause the computing device to generate a static environment echo profile based on ones of the echoes reflected off static objects in the vicinity of the computing device, compare the echoes to the static environment echo profile, and identify a presence of the first object based on the comparison.

Example 27 includes the non-transitory computer readable medium of example 26, wherein the instructions further cause the computing device to identify a change in the environment based on the echoes, and update the static environment echo profile based on the change in the environment.

Example 28 includes the non-transitory computer readable medium of any one of examples 26 or 27, wherein the instructions further cause the computing device to generate a full echo profile based on the pulses and the corresponding echoes, remove static data corresponding to the static environment echo profile from the full echo profile to generate a non-static echo profile, and determine whether the first object is within the activation region based on the non-static echo profile.

Example 29 includes the non-transitory computer readable medium of any one of examples 23-28, wherein the instructions further cause the computing device to produce successive ones of the pulses spaced at first fixed intervals during a first time period, detect the first object within the activation region based on the pulses and corresponding echoes sensed during the first time period, in response to detecting the first object within the activation region during the first time period, produce additional ones of the pulses spaced at second fixed intervals during a second time period after the first time period, the second fixed intervals being shorter than the first fixed intervals, and verify the first object is within the activation region based on the pulses and corresponding echoes sensed during the second time period.

Example 30 includes the non-transitory computer readable medium of example 29, wherein the instructions further cause the computing device to, in response to no longer detecting the first object within the activation region during the second time period, produce additional ones of the pulses spaced at the first fixed intervals during a third time period after the second time period.

Example 31 includes the non-transitory computer readable medium of any one of examples 23-30, wherein the instructions further cause the computing device to generate a full echo profile based on the pulses and the corresponding echoes, identify peaks in the full echo profile, different ones of the peaks corresponding to either the pulses or the corresponding echoes, identify repeating reference signals based on the peaks identified in the full echo profile, the repeating reference signals corresponding to the pulses, identify an echo signal between separate occurrences of the repeating reference signals, the echo signal corresponding to one of the echoes, and determining whether the first object is within the activation region based on a time difference between the echo signal and a preceding one of the repeating reference signals.

Example 32 includes the non-transitory computer readable medium of example 31, wherein the instructions further cause the computing device to identify the repeating reference signals by identifying a first subset of the peaks associated with an intensity that satisfy a threshold, and identifying a second subset of the peaks from among the first subset that are detected at a periodicity corresponding to the fixed intervals of the pulses.

Example 33 includes the non-transitory computer readable medium of any one of examples 31 or 32, wherein the instructions further cause the computing device to identify the repeating reference signals at a first point in time, verify whether subsequent ones of the peaks identified after the first point in time are associated with an intensity and a periodicity corresponding to subsequent occurrences of the repeating reference signals, in response to verification that the subsequent ones of the peaks correspond to the subsequent occurrences of the repeating reference signals, determine whether the first object is within the activation region, and in response to an inability to verify that the subsequent ones of the peaks correspond to the subsequent occurrences of the repeating reference signals, inhibit the determination of whether the first object is within the activation region until the repeating reference signals are again identified at a second point in time.

Example 34 includes a computing device comprising a speaker to produce a series of repeating pulses at a consistent periodicity, the repeating pulses having a central frequency between 18 kHz and 24 kHz, a microphone to sense noise information including the pulses and echoes of the pulses reflected off objects in an environment surrounding the computing device, and at least one processor to determine a proximity of a first one of the objects based on the noise information.

Example 35 includes the computing device of example 34, wherein the at least processor is to, in response to detection of the first object within an activation region associated with the computing device, implement an operation in the computing device.

Example 36 includes the computing device of example 35, wherein the operation includes waking up the computing device from a sleep state to an active state.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A computing device comprising:
a speaker;
at least one storage device;
instructions; and
at least one processor to execute the instructions to:
cause the speaker to produce a series of pulses, successive ones of the pulses spaced at first intervals during a first time period;
process noise information to determine whether an object is within an activation region associated with the computing device, the noise information output by a microphone, the noise information representative of at least some of the pulses and echoes of the at least some of the pulses reflected off surfaces in a vicinity of the computing device;
in response to detection of the object within the activation region during the first time period, cause the speaker to produce an additional series of pulses spaced at second intervals during a second time period after the first time period, the second intervals being shorter than the first intervals; and
verify the object is within the activation region based on additional noise information during the second time period.

2. The computing device of claim 1, wherein the at least one processor is to, in response to a determination that the object is within the activation region, execute an operation in the computing device.

3. The computing device of claim 2, wherein the operation includes transitioning the computing device from a first state to a second state, the first state being a lower power state than the second state.

4. The computing device of claim 1, wherein the at least one processor is to:
generate a static environment echo profile based on ones of the echoes reflected off static ones of the surfaces in the vicinity of the computing device; and
compare the echoes represented in at least one of the noise information or the additional noise information to the static environment echo profile.

5. The computing device of claim 4, wherein the at least one processor is to identify a change in an environment surrounding the computing device based on at least one of the noise information or the additional noise information, and update the static environment echo profile based on the change in the environment.

6. The computing device of claim 4, wherein the at least one processor is to:
generate a full echo profile based on at least one of the noise information or the additional noise information;
remove static data corresponding to the static environment echo profile from the full echo profile to generate a non-static echo profile; and
process at least one of the noise information or the additional noise information to determine whether the object is within the activation region based on the non-static echo profile.

7. The computing device of claim 1, wherein the at least one processor is to, in response to the object not being detected within the activation region during the second time period, cause the speaker to produce a third series of pulses during a third time period after the second time period.

8. The computing device of claim 1, wherein at least one of the pulses in the series of pulses have a central frequency in a near ultrasonic range.

9. A computing device comprising:
a speaker;
at least one storage device;
instructions; and
at least one processor to execute the instructions to:
cause the speaker to produce a series of pulses;
generate a full echo profile based on pulses and corresponding echoes sensed by a microphone;
identify peaks in the full echo profile, different ones of the peaks corresponding to respective one of the pulses or the corresponding echoes;
identify repeating reference signals based on the peaks identified in the full echo profile, the repeating reference signals corresponding to the pulses;
identify an echo signal between separate occurrences of the repeating reference signals, the echo signal corresponding to one of the echoes; and
determine whether an object is within an activation region associated with the computing device based on a time difference between the echo signal and a preceding one of the repeating reference signals.

10. The computing device of claim 9, wherein the at least one processor is to identify the repeating reference signals by:
    identifying a first subset of the peaks associated with an intensity that satisfy a threshold; and
    identifying a second subset of the peaks from among the first subset that are detected at a periodicity corresponding to an interval at which the speaker is to produce the pulses.

11. The computing device of claim 9, wherein the at least one processor is to:
    identify the repeating reference signals at a first point in time;
    verify whether subsequent ones of the peaks identified after the first point in time are associated with an intensity and a periodicity corresponding to subsequent occurrences of the repeating reference signals;
    in response to verification that the subsequent ones of the peaks correspond to the subsequent occurrences of the repeating reference signals, determine whether the object is within the activation region; and
    in response to an inability to verify that the subsequent ones of the peaks correspond to the subsequent occurrences of the repeating reference signals, inhibit the determination of whether the object is within the activation region until the repeating reference signals are again identified at a second point in time.

12. The computing device of claim 9, wherein the activation region is defined by a threshold distance from the computing device.

13. A method comprising:
    producing, via a speaker of a computing device, a first series of pulses, successive ones of the pulses in the first series spaced at first intervals during a first time period;
    processing, by executing an instruction with at least one processor, noise information from an output of a microphone to determine whether an object is within an activation region associated with the computing device, the noise information representative of at least some of the pulses in the first series and first echoes of the pulses in the first series reflected off surfaces in a vicinity of the computing device;
    in response to detection of the object within the activation region during the first time period, producing second series of pulses spaced at second intervals during a second time period after the first time period, the second intervals being shorter than the first intervals; and
    verifying the object is within the activation region based on at least some of the pulses in the second series and corresponding second echoes sensed during the second time period.

14. The method of claim 13, further including:
    generating a static environment echo profile based on at least some of the first or second echoes reflected off static ones of the surfaces in the vicinity of the computing device; and
    comparing the at least some of the first and second echoes represented to the static environment echo profile.

15. The method of claim 13, wherein at least one of the pulses in at least one of in the first or second series have a central frequency in a near ultrasonic range.

16. A non-transitory computer readable medium comprising instructions to cause a computing device to at least:
    produce a series of pulses, successive ones of the pulses spaced at first intervals during a first time period;
    access noise information output by a microphone, the noise information representative of the pulses and echoes of the pulses reflected off surfaces in a vicinity of the computing device;
    process the noise information to determine whether an object is within an activation region associated with the computing device;
    in response to detection of the object within the activation region during the first time period, produce additional ones of the pulses spaced at second intervals during a second time period after the first time period, the second intervals being shorter than the first intervals; and
    verify the object is within the activation region based on the pulses and corresponding echoes sensed during the second time period.

17. The non-transitory computer readable medium of claim 16, wherein the instructions further cause the computing device to, in response to a determination that the object is within the activation region, execute an operation in the computing device.

18. The non-transitory computer readable medium of claim 17, wherein the operation includes transitioning the computing device from a first state to a second state, the first state being a lower power state than the second state.

19. The non-transitory computer readable medium of claim 17, wherein the instructions further cause the computing device to:
    generate a static environment echo profile based on ones of the echoes reflected off static ones of the surfaces in the vicinity of the computing device; and
    compare the echoes represented in the noise information to the static environment echo profile.

20. The non-transitory computer readable medium of claim 19, wherein the instructions further cause the computing device to:
    generate a full echo profile based on the noise information; and
    remove static data corresponding to the static environment echo profile from the full echo profile to generate a non-static echo profile, the determination of whether the object is within the activation region based on the non-static echo profile.

21. The non-transitory computer readable medium of claim 16, wherein at least one of the pulses have a central frequency in a near ultrasonic range.

22. A non-transitory computer readable medium comprising instructions to cause a computing device to at least:
    produce a series of pulses;
    access noise information output by a microphone, the noise information representative of the pulses and echoes of the pulses reflected off surfaces in a vicinity of the computing device;
    generate a full echo profile based on the pulses and corresponding echoes;
    identify peaks in the full echo profile, different ones of the peaks corresponding to either the pulses or the corresponding echoes;
    identify repeating reference signals based on the peaks identified in the full echo profile, the repeating reference signals corresponding to the pulses;

identify an echo signal between separate occurrences of the repeating reference signals, the echo signal corresponding to one of the echoes; and determine whether an object is within an activation region associated with the computing device based on a time difference between the echo signal and a preceding one of the repeating reference signals.

23. A computing device comprising:

means for producing a first series of first pulses, successive ones of the first pulses spaced at first intervals during a first time period; and means for processing noise information, the noise information corresponding to an output of a microphone, the noise information representative of the first pulses and first echoes of the first pulses reflected off surfaces in a vicinity of the computing device, the processing means to:

determine a presence of an object within an activation region associated with the computing device based on the noise information;

in response to detection of the object within the activation region during the first time period, cause the means for producing to produce a second series of second pulses spaced at second intervals during a second time period after the first time period, the second intervals being shorter than the first intervals; and verify the object is within the activation region based on the second pulses and corresponding second echoes sensed during the second time period.

24. The computing device of claim 23, wherein the processing means is to activate an operation in the computing device in response to a determination that the object is present within the activation region.

25. The computing device of claim 24, wherein the operation includes waking up the computing device from a sleep state to an active state.

* * * * *